US008803365B2

(12) United States Patent
Lee et al.

(10) Patent No.: US 8,803,365 B2
(45) Date of Patent: Aug. 12, 2014

(54) WIRELESS POWER TRANSMISSION/RECEPTION APPARATUS AND METHOD

(75) Inventors: Kwang Du Lee, Gyunggi-do (KR); Jeong Hoon Kim, Gyunggi-do (KR); Joun Sup Park, Gyunggi-do (KR); Eung Ju Kim, Gyunggi-do (KR); Sang Hoon Hwang, Seoul (KR); Young Seok Yoon, Chungcheongnam-do (KR); Chul Gyun Park, Gyunggi-do (KR); Jung Ho Yoon, Gyunggi-do (KR)

(73) Assignee: Samsung Electro-Mechanics Co., Ltd., Suwon, Gyuaggi-do (KR)

( * ) Notice: Subject to any disclaimer, the term of this patent is extended or adjusted under 35 U.S.C. 154(b) by 709 days.

(21) Appl. No.: 13/037,001

(22) Filed: Feb. 28, 2011

(65) Prior Publication Data

US 2012/0146425 A1 Jun. 14, 2012

(30) Foreign Application Priority Data

Dec. 14, 2010 (KR) .......................... 10-2010-0127537

(51) Int. Cl.
*H04B 5/00* (2006.01)

(52) U.S. Cl.
CPC ............ *H04B 5/0037* (2013.01); *H04B 5/0025* (2013.01); *H04B 5/0056* (2013.01); *H04B 5/0075* (2013.01); *H04B 5/0093* (2013.01)
USPC ........................................................ 307/104

(58) Field of Classification Search
CPC ...... H04B 5/00; H04B 5/0025; H04B 5/0037; H04B 5/0056; H04B 5/0075; H04B 5/0093
USPC .......................................................... 307/104
See application file for complete search history.

(56) References Cited

U.S. PATENT DOCUMENTS 4,886,952 A * 12/1989 Horiuchi ....................... 219/661
7,521,890 B2 * 4/2009 Lee et al. ....................... 320/108
(Continued)

FOREIGN PATENT DOCUMENTS

| JP | 10290183 A | * 10/1998 | ............... H04B 3/34 |
| JP | 2010-158151 A | 7/2010 | |
| JP | 2010-268660 A | 11/2010 | |

OTHER PUBLICATIONS

Office Action issued for related KR 10-2010-0127537 dated May 15, 2012, and its English summary provided by the client.

*Primary Examiner* — Adi Amrany
(74) *Attorney, Agent, or Firm* — McDermott Will & Emery LLP

(57) ABSTRACT

A wireless power transmission/reception apparatus includes a wireless power transmission unit. The transmission unit is configured to generate a wireless power signal to be transmitted, transmit the wireless power signal using magnetic resonance, receive a reflected wireless power signal from a wireless power reception unit, determine whether a load device is present, and transmit a further wireless power signal when it is determined that the load device is present in such a way that impedance and output power depending on variation in a distance to the load device are tracked, and wireless power is supplied to the load device in an optimized state. Accordingly, a separate transceiver module is not provided for the purpose of performing communication between a transmitting end and a receiving end, and a reception environment is automatically detected, thus enabling wireless power to be transmitted in an optimal wireless power transmission state.

6 Claims, 15 Drawing Sheets

(56) References Cited

U.S. PATENT DOCUMENTS

| | | | | |
|---|---|---|---|---|
| 7,639,199 | B2* | 12/2009 | Rofougaran | 343/860 |
| 7,893,888 | B2* | 2/2011 | Rofougaran | 343/860 |
| 8,064,495 | B2* | 11/2011 | Rofougaran | 375/136 |
| 8,299,652 | B2* | 10/2012 | Sample et al. | 307/104 |
| 8,374,545 | B2* | 2/2013 | Menegoli et al. | 455/41.1 |
| 8,452,235 | B2* | 5/2013 | Kirby et al. | 455/41.1 |
| 8,487,478 | B2* | 7/2013 | Kirby et al. | 307/104 |
| 8,581,445 | B2* | 11/2013 | Ichikawa | 307/104 |
| 2003/0114182 | A1* | 6/2003 | Chan et al. | 455/525 |
| 2009/0284082 | A1* | 11/2009 | Mohammadian | 307/104 |
| 2009/0284218 | A1* | 11/2009 | Mohammadian et al. | 320/107 |
| 2009/0284220 | A1* | 11/2009 | Toncich et al. | 320/108 |
| 2010/0187913 | A1* | 7/2010 | Smith et al. | 307/104 |
| 2010/0225400 | A1* | 9/2010 | Rofougaran et al. | 330/295 |
| 2010/0248622 | A1* | 9/2010 | Kirby et al. | 455/41.1 |
| 2010/0321086 | A1* | 12/2010 | See et al. | 327/359 |
| 2011/0053500 | A1* | 3/2011 | Menegoli et al. | 455/41.1 |
| 2011/0231029 | A1* | 9/2011 | Ichikawa et al. | 700/298 |
| 2012/0019057 | A9* | 1/2012 | Kirby et al. | 307/9.1 |
| 2012/0080957 | A1* | 4/2012 | Cooper et al. | 307/104 |
| 2013/0234503 | A1* | 9/2013 | Ichikawa | 307/9.1 |

* cited by examiner

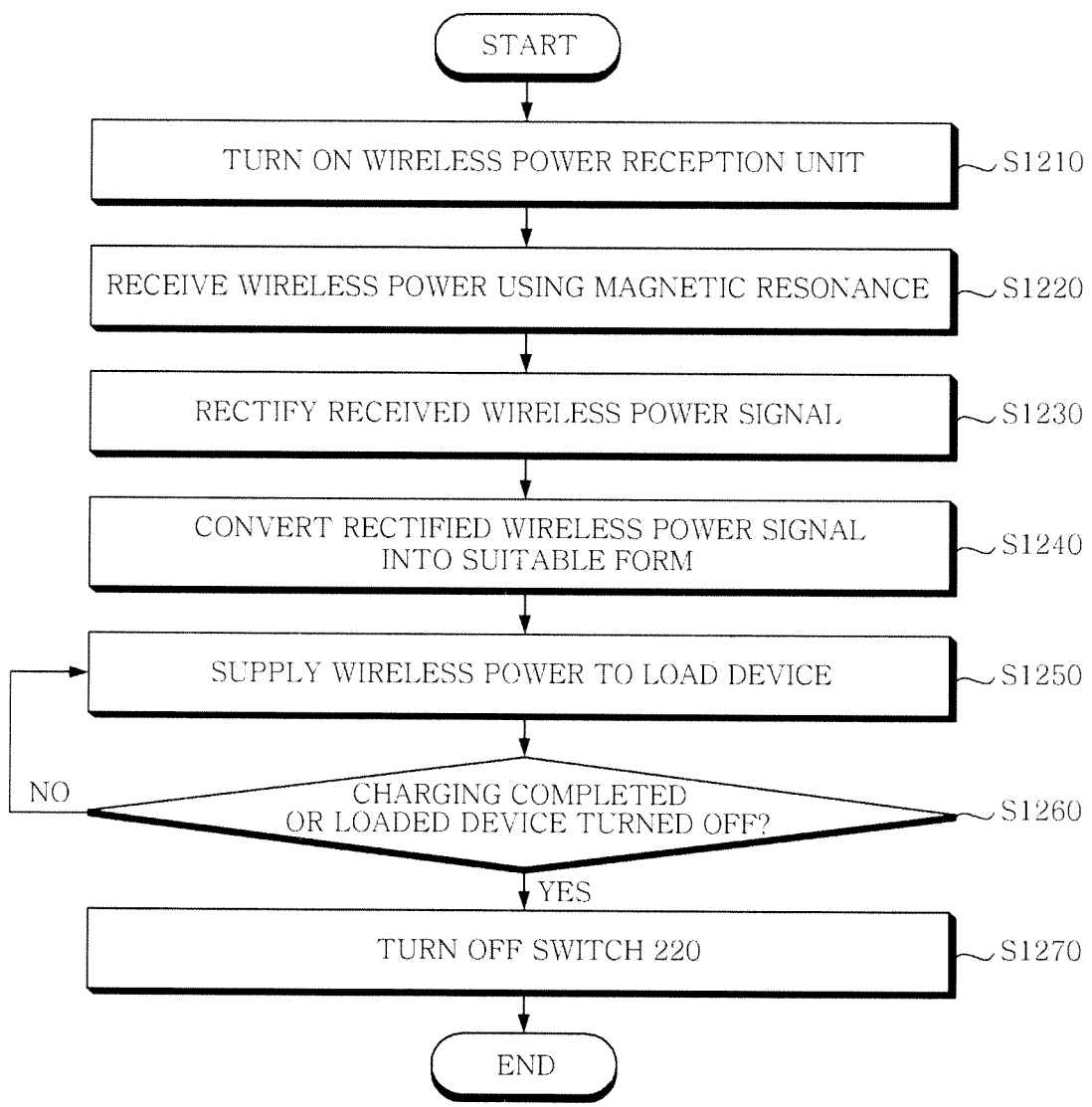

WIRELESS POWER TRANSMISSION/RECEPTION APPARATUS AND METHOD

CROSS REFERENCE TO RELATED APPLICATION

This application claims the benefit of Korean Patent Application No. 10-2010-0127537, filed on Dec. 14, 2010, entitled "Wireless power transmission apparatus and transmission method thereof", which is hereby incorporated by reference in its entirety into this application.

BACKGROUND OF THE INVENTION

1. Technical Field

The present invention relates to a wireless power transmission apparatus and method.

2. Description of the Related Art

With the development of wireless communication technology, ubiquitous information environments enabling anyone to exchange desired information anytime and anywhere have been implemented. However, most communication information devices still depend on batteries and are supplied with power by a wired power cord, and thus the use of communication information devices is limited. Therefore, the environment of a wireless information network cannot be actually freed from this limitation until the problem of terminal power is solved.

In order to solve this problem, various types of technologies for transmitting power in a wireless manner have been developed.

First, representative technologies may include radio reception technology using microwaves, magnetic induction technology using magnetic fields, and magnetic resonance technology using the energy conversion of magnetic fields and electric fields.

In this case, radio reception technology is advantageous because microwaves are radiated into the air through an antenna, and thus long-distance power transmission is made possible. However, radio reception technology has high radiation loss due to the consumption of power by the air, and thus the efficiency of power transmission is limited.

Further, magnetic induction technology is a technology based on the coupling of magnetic energy using the primary coil of a transmitting end and the secondary coil of a receiving end, and is advantageous in that the efficiency of power transmission is high. However, magnetic induction technology is disadvantageous in that the primary coil of the transmitting end and the secondary coil of the receiving end must be located adjacent to each other within a short distance of about several mm so as to transmit power. Furthermore, magnetic induction technology is disadvantageous in that the efficiency of power transmission rapidly changes according to the alignment of the primary coil of the transmitting end and the secondary coil of the receiving end, and in that the amount of heat generated is large.

Therefore, magnetic resonance technology that is similar to magnetic induction technology has recently been developed, but it is configured to concentrate energy on a specific resonant frequency determined by a coil inductor L and a capacitor C, and thus to transmit power in the form of magnetic energy.

Such a magnetic resonance technology is advantageous because a relatively large amount of power can be transmitted even a distance of several meters, but requires high resonance characteristics (high quality factor).

In other words, magnetic resonance technology is disadvantageous because the efficiency of power transmission rapidly changes depending on whether impedance matching has been realized or whether the resonant frequencies of the LC circuit of the transmitting end and the LC circuit of the receiving end are identical to each other.

In particular, impedance mismatching and transmission efficiency at low output power, which are caused by variations in the distance between the transmitting end and the receiving end, become principal factors which interfere with optimal wireless power transmission in wireless power transmission.

For this, conventional magnetic induction technology deals with the above problems via communication between the transmitting end and the receiving end by mounting communication devices (for example, transceivers) both on the transmitting end and on the receiving end.

However, when the communication devices (for example, transceivers) are separately mounted, problems arise in that costs required for a wireless power transmission apparatus increase, and the construction of the apparatus becomes complicated.

Further, a power amplifier for amplifying the output power to improve transmission efficiency at low output power must always be kept turned on even when power amplification is not required, and thus this driving of the power amplifier wastes power unnecessarily.

SUMMARY OF THE INVENTION

Accordingly, the present invention has been made keeping in mind the above problems occurring in the prior art, and the present invention is intended to provide a wireless power transmission/reception apparatus and method, in which a separate transceiver module is not provided for the purpose of performing communication between a transmitting end and a receiving end, and a reception environment is automatically detected, thus enabling wireless power to be transmitted in an optimal wireless power transmission state.

Further, the present invention is intended to provide a wireless power transmission/reception apparatus and method, which automatically track and adjust impedance and output power so that optimal impedance and maximum output power can be obtained when a distance between a transmitting end and a receiving end varies.

Furthermore, the present invention is intended to provide a wireless power transmission/reception apparatus and method, which employ a power amplifier enabling ON/OFF control, thus minimizing the unnecessary consumption of power.

In accordance with an aspect of the present invention, there is provided a wireless power transmission/reception apparatus, including a wireless power transmission unit configured to receive externally input power, generate a wireless power signal to be transmitted in a wireless manner, transmit the generated wireless power signal using magnetic resonance, receive a reflected wireless power signal, determine whether a load device is present, and transmit a wireless power signal if it is determined that the load device is present in such a way that variations in impedance and output power depending on a variation in a distance to the load device are automatically tracked, and a wireless power signal, which has been matched to optimal impedance and which has been amplified to maximum output power, is transmitted in a wireless manner to allow power to be supplied to the load device; and a wireless power reception unit connected to the load device, and configured to receive the wireless power signal from the wireless power transmission unit using magnetic resonance, to provide the wireless power signal to the load device connected to the wireless power reception unit, and to reflect a reflected wireless power signal, which was not consumed, towards the wireless power transmission unit.

Further, the wireless power transmission unit may include a frequency oscillator for receiving the externally input power and generating a wireless power signal desired to be transmitted; a power amplifier for amplifying the wireless power signal generated by the frequency oscillator and outputting an amplified wireless power signal; a first resonant antenna for transmitting the wireless power signal using magnetic resonance, and receiving the reflected wireless power signal that is reflected from the wireless power reception unit using magnetic resonance; an impedance matching unit disposed between the power amplifier and the first resonant antenna and configured to vary impedance to optimal impedance so as to provide impedance matching between the power amplifier and the first resonant antenna; a directional power coupler disposed between the power amplifier and the impedance matching unit or between the impedance matching unit and the first resonant antenna, and configured to have directionality such that the wireless power signal, which is input from the power amplifier or the impedance matching unit through a first port, is output to the first resonant antenna through a second port, and such that the reflected wireless power signal, which is input from the first resonant antenna through the second port, is output through a third port; an output power detector for detecting output power from the wireless power signal which is output from the second port of the directional power coupler, and outputting detected output power; a reflected power detector for detecting reflected power from the reflected wireless power signal which is output from the third port of the directional power coupler, and outputting detected reflected power; a variable voltage regulator for varying an input voltage and transferring a boosted output voltage to the power amplifier so that a wireless power signal to be amplified by the power amplifier has maximum output power depending on an output power-to-reflected power ratio; and a transmission controller for detecting whether a load device is present depending on the output power-to-reflected power ratio calculated using the output power and the reflected power which have been input, controlling the impedance matching unit so that if the load device is present, impedance attributable to the variation in the distance to the load device automatically varies depending on the output power-to-reflected power ratio, thereby realizing matching to optimal impedance, and controlling the variable voltage regulator so that if the load device is present, the output power attributable to the variation in the distance to the load device automatically varies depending on the output power-to-reflected power ratio, thereby allowing maximum output power to be tracked, the transmission controller performing control such that the wireless power signal which has been matched to the optimal impedance and has been amplified to the maximum output power is transmitted through the first resonant antenna.

Further, the wireless power reception unit may include a second resonant antenna for receiving the wireless power signal from the wireless power transmission unit using magnetic resonance, and reflecting the reflected wireless power signal towards the wireless power transmission unit; a rectifier for rectifying the wireless power signal received by the second resonant antenna; a power signal converter to which the load device is connected, the power signal converter converting the wireless power signal rectified by the rectifier into a power signal based on a power supply method and providing the power signal to the load device; and a reception controller for performing control such that the second resonant antenna receives the wireless power signal using magnetic resonance and power is supplied to the load device, and performing control such that the reflected wireless power signal is reflected towards the wireless power transmission unit.

In accordance with another aspect of the present invention, there is provided a wireless power transmission/reception method, including (A) a wireless power transmission unit transmitting a wireless power signal to a wireless power reception unit using magnetic resonance, detecting reflected power from a reflected wireless power signal, and determining whether a load device connected to the wireless power reception unit is present; and (B) if it is determined that the load device connected to the wireless power reception unit is present, the wireless power transmission unit automatically tracking variations in impedance and output power attributable to a variation in a distance between the wireless power transmission unit and the load device, and then transmitting a wireless power signal which has been matched to optimal impedance and has been amplified to maximum output power.

In accordance with a further aspect of the present invention, there is provided a wireless power transmission method, including (A) a wireless power transmission unit transmitting a wireless power signal to a wireless power reception unit using magnetic resonance; (B) the wireless power transmission to unit receiving a reflected wireless power signal which has been reflected from the wireless power reception unit, detecting reflected power from the reflected wireless power signal, and determining whether a load device connected to the wireless power reception unit is present depending on an output power-to-reflected power ratio which uses both the reflected power and output power detected from the wireless power signal; (C) if it is determined by the wireless power transmission unit that the load device connected to the wireless power reception unit is present, the wireless power transmission unit automatically tracking variations in impedance and output power attributable to the variation in the distance between the wireless power transmission unit and the load device; and (D) transmitting a wireless power signal which has been matched to the tracked optimal impedance and has been amplified to the tracked maximum output power.

In accordance with yet another aspect of the present invention, there is provided a wireless power reception method, including (A) a wireless power reception unit receiving a wireless power signal which has been transmitted from a wireless power transmission unit, providing the wireless power signal to a load device connected to the wireless power reception unit, and thereafter reflecting a reflected wireless power signal; and (B) if connection of the load device to the wireless power reception unit is released, stopping reception of the wireless power signal transmitted from the wireless power transmission unit.

BRIEF DESCRIPTION OF THE DRAWINGS

FIG. 12 is a flowchart showing the operation of the wireless power reception unit according to an embodiment of the present invention.

DESCRIPTION OF THE PREFERRED EMBODIMENTS

The above and other objects, features and advantages of the present invention will be more clearly understood from the following detailed description taken in conjunction with the accompanying drawings.

Prior to giving the description, the terms and words used in the present specification and claims should not be interpreted as being limited to their typical meaning based on the dictionary definitions thereof, but should be interpreted to have the meaning and concept relevant to the technical spirit of the present invention on the basis of the principle by which the inventor can suitably define the implications of terms in the way which best describes the invention.

Hereinafter, embodiments of the present invention will be described in detail with reference to the attached drawings.

Figure 1:
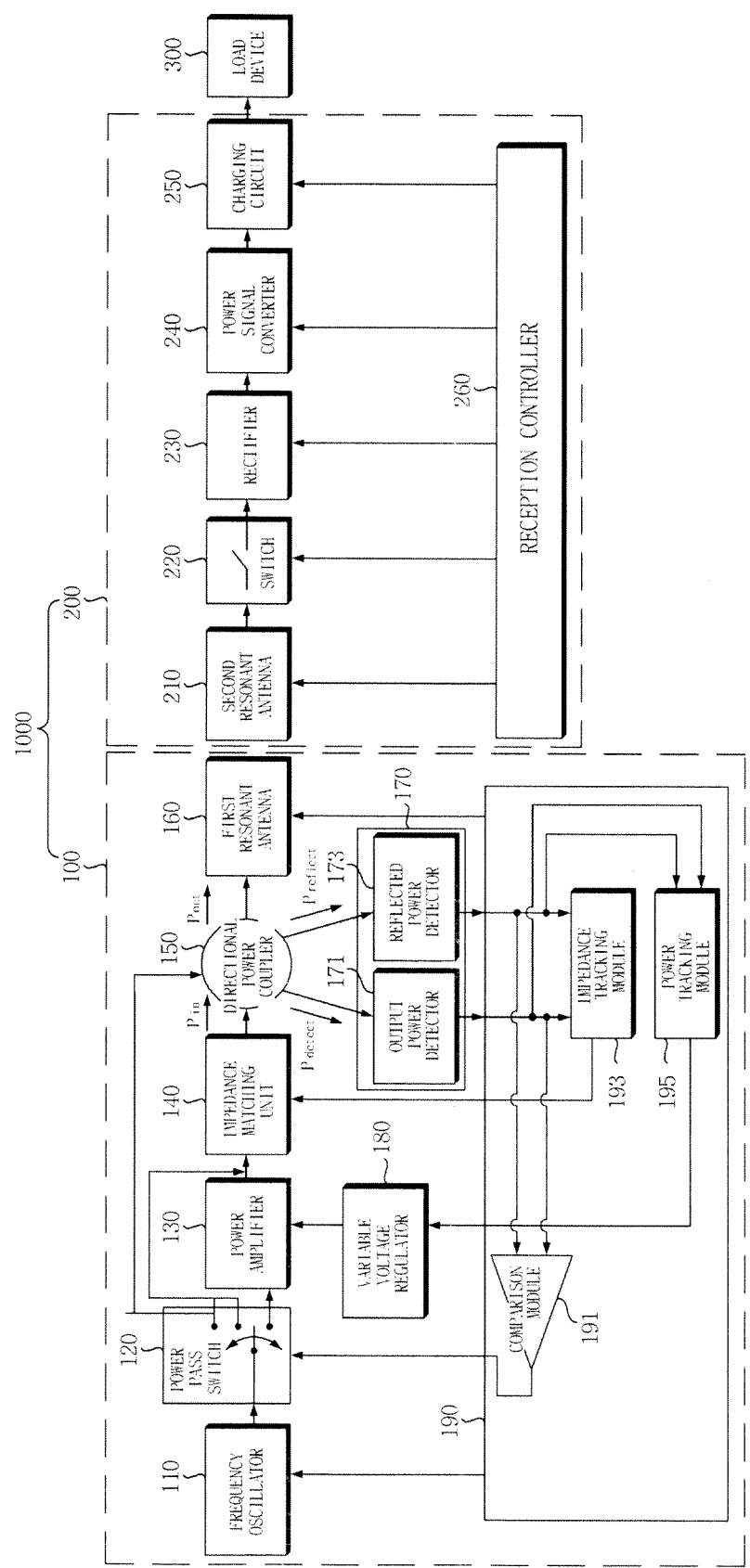
FIG. 1 is a block diagram schematically showing the construction of a wireless power transmission/reception apparatus according to an embodiment of the present invention.

FIG. 1 is a block diagram schematically showing the construction of a wireless power transmission/reception apparatus according to an embodiment of the present invention.

Referring to FIG. 1, a wireless power transmission/reception apparatus 1000 according to an embodiment of the present invention mainly includes a wireless power transmission unit 100 and a wireless power reception unit 200.

The wireless power transmission unit 100 includes a frequency oscillator 110, a power pass switch 120, a power amplifier 130, an impedance matching unit 140, a directional power coupler 150, a first resonant antenna 160, a power detector 170, a variable voltage regulator 180, and a transmission controller 190.

Further, the wireless power reception unit 200 includes a second resonant antenna 210, a switch 220, a rectifier 230, a power signal converter 240, a charging circuit 250, and a reception controller 260.

The transmission of wireless power between the wireless power transmission unit 100 and the wireless power reception unit 200 is performed using magnetic resonance.

That is, wireless power transmitted from the wireless power transmission unit 100 using magnetic resonance is received by the wireless power reception unit 200 using magnetic resonance. The wireless power received in this way is supplied to or stored in a load device 300 connected to the wireless power reception unit 200.

A wireless power transmission procedure between the wireless power transmission unit 100 and the wireless power reception unit 200 performed using magnetic resonance will be briefly described. First, the wireless power transmission unit 100 generates a wireless power signal, and the wireless power signal is converted into magnetic energy using LC resonance by the first resonant antenna 160 composed of a variable inductor and a variable capacitor.

Then, the converted magnetic energy is magnetically-coupled to the second resonant antenna 210 composed of a variable inductor and a variable capacitor in the wireless power reception unit 200, thus performing wireless power transmission using magnetic resonance.

In this case, the impedance and the output power of the wireless power signal, which vary depending on a variation in the distance between the wireless power transmission unit 100 and the wireless power reception unit 200 and a change in the locations of the wireless power transmission and reception units, are automatically tracked, and thus the coupling of magnetic energy can be maximized by realizing optimal impedance matching or by adjusting the magnitude of an output voltage so that the wireless power signal can be amplified to the maximum output power.

Meanwhile, for a magnetic field caused by the magnetic coupling, the phrase "a magnetic field always forms a closed-loop" is defined according to the fourth law of Maxwell's equations, which are related to electromagnetic waves.

Therefore, unlike an electric field having properties of being propagated over a distance like waves, a magnetic field can be interpreted as always retaining its energy due to its properties of returning while forming a circle if no loss is caused by the media.

If these properties are utilized, the wireless power transmission unit 100 can be aware of the environment of the wireless power reception unit 200 in an environment in which communication is not performed between the wireless power transmission unit 100 and the wireless power reception unit 200 (for example, an environment in which a transceiver for wireless communication is not provided).

That is, if the load device 300 connected to the wireless power reception unit 200 is not present or is turned off (that is, if the load device 300 is not connected to the wireless power reception unit 200) while the wireless power transmission unit 100 is turned on, energy loss does not result from the wireless power transmission unit 100, and thus it can be determined that in a wireless power transmission environment, the load device 300 connected to the wireless power reception unit 200 is not present.

In contrast, if the load device 300 connected to the wireless power reception unit 200 is present, energy loss results from the wireless power transmission unit 100, and thus it can be determined that the load device 300 connected to the wireless power reception unit 200 is present.

Therefore, reflected power in which the wireless power transmitted from the wireless power transmission unit 100 has been reflected is measured, so that the presence of the load device 300 connected to the wireless power reception unit 200 is determined. Further, when the load device 300 connected to the wireless power reception unit 200 is present, impedance and output power are adjusted depending on the variation in the distance between the wireless power transmission unit 100 and the wireless power reception unit 200 to which the load device 300 is connected, so that wireless power can be transmitted in an optimal state, thus improving wireless power transmission efficiency.

Here, the load device 300 is a device for receiving wireless power that has been transferred from the wireless power transmission unit 100 to the wireless power reception unit 200 and for consuming the received power in such a way that the load device 300 is charged with the power or is supplied with power for home use.

For example, the load device may be an electronic/electric home appliance such as a television or a computer, or a battery.

Next, the respective constructions and operating methods of the wireless power transmission unit 100 and the wireless power reception unit 200, to which the load device 300 can be connected, in the wireless power transmission/reception apparatus 1000 according to an embodiment of the present invention will be described in detail below.

First, the construction and operating method of the wireless power transmission unit 100 according to an embodiment of the present invention will be described.

The frequency oscillator 110 converts external power into a wireless power signal. Here, the wireless power signal is an Alternating Current (AC) signal. Since an externally applied AC signal may have the form of an AC signal inappropriate for the transmission of wireless power, the frequency oscillator 110 converts the external power into an AC signal appropriate for wireless transmission and outputs the AC signal.

The oscillation frequency of the wireless power signal generated by the frequency oscillator 110 is less than a resonant frequency set by the adjustment of the variable inductor and the variable capacitor of the first resonant antenna 160, and is identical to a resonant frequency calculated by adding mutual inductance values ranging from the first resonant antenna 160 to the receiving end to the resonant frequency.

The power amplifier 130 amplifies and outputs the wireless power signal so that the intensity of the wireless power signal is increased or is adjusted to a predetermined intensity in order to improve the efficiency of wireless power transmission.

In this case, the power pass switch 120 may be disposed between the frequency oscillator 110 and the power amplifier 130.

The power pass switch 120 provides a bypass path so as to connect the frequency oscillator 110 to the power amplifier 130 or connect the frequency oscillator 110 to the impedance matching unit 140 (or the directional power coupler 150) depending on whether a load device 300 connected to the reception unit 200 is present.

That is, if a load device 300 connected to the reception unit 200 is not present, the wireless power signal generated by the frequency oscillator 110 is not amplified by the power amplifier 130, bypasses the power amplifier 130, and is switched to the impedance matching unit 140 (or the directional power coupler 150) through the power pass switch 120, so that whether a load device 300 connected to the reception unit 200 is present can be periodically determined, and unnecessary power consumption can be minimized.

The impedance matching unit 140 is disposed between the power amplifier 130 and the first resonant antenna 160. As described above, in order to transmit the wireless power signal at the optimal transmission efficiency, the impedance matching unit 140 provides the impedance matching depending on the variation in the distance between the wireless power transmission unit 100 and the wireless power reception unit 200 and the change in the locations of the wireless power transmission and reception units 100 and 200.

In detail, as the distance between the wireless power transmission unit 100 and the wireless power reception unit 200 to which the load device 300 is connected becomes longer, the coupling force of magnetic energy is weakened, and thus impedance mismatching occurs.

Figure 2A:
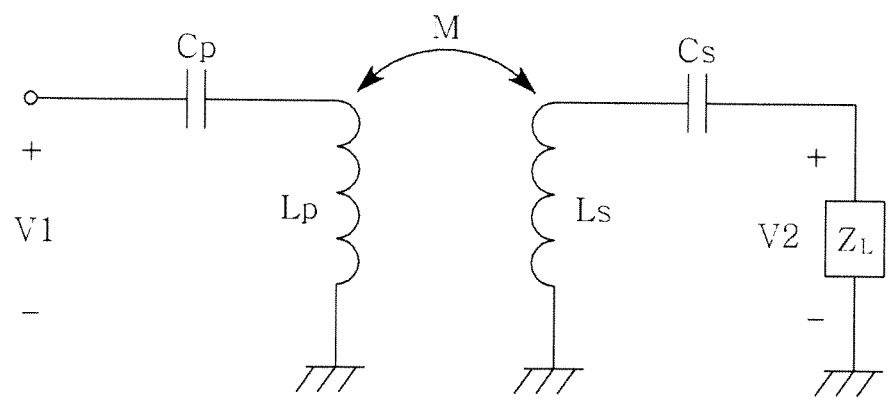
FIGS. 2A and 2B are equivalent circuit diagrams showing input impedance viewed from the wireless power transmission unit of FIG. 1.
Figure 2B:
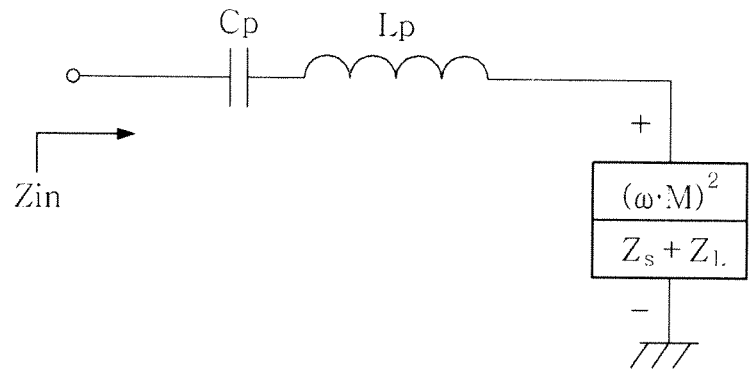

FIGS. 2A and 2B are equivalent circuit diagrams showing input impedance viewed from the wireless power transmission unit of FIG. 1.

Referring to FIG. 2, if it is assumed that the wireless power transmission unit 100 is composed of a capacitor Cp and an inductor Lp and the wireless power reception unit 200 is composed of a capacitor Cs and an inductor Ls, and that mutual inductance between the wireless power transmission and reception units 100 and 200 is M (refer to FIG. 2A), an equivalent circuit of input impedance $Z_{in}$ viewed from the wireless power transmission unit 100 can be represented as shown in FIG. 2B, and can be given by the following Equations (1) to (4):

$$Z_{in} = Z_P + \frac{(\omega \cdot M)^2}{Z_S + Z_L} \tag{1}$$

$$Z_P = sL_P + \frac{1}{sC_P} \tag{2}$$

$$Z_S = sL_S + \frac{1}{sC_S} \tag{3}$$

$$M = k\sqrt{L_P \cdot L_S} \tag{4}$$

When Equations (2) and (3) and $s=j\cdot\omega$ are applied to Equation (1), mutual inductance M can be obtained as given in Equation (4), where k is a magnetic coupling constant ($k \leq 1$).

As given in Equation (4), the mutual inductance M is a function of the magnetic coupling constant k, and the magnetic coupling constant k varies depending on the variation in the distance between the transmission and reception units.

Therefore, in the case where a change in the location of the wireless power reception unit 200 to which the load device 300 is connected (that is, a variation in the distance between the transmission and reception units) occurs, if a value of LC is determined by the resonant frequency, the input impedance $Z_{in}$ is influenced by mutual inductance M which is transmission/reception coupling energy.

Figure 3A:
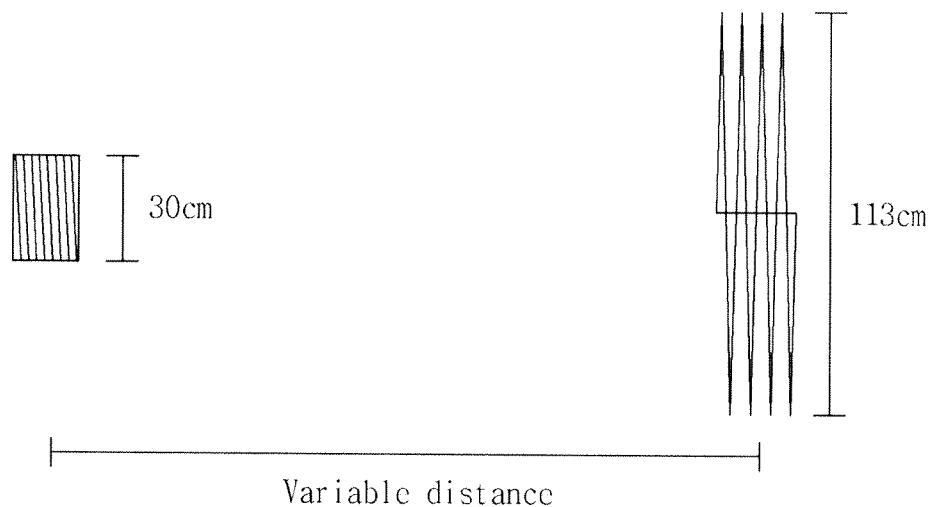
FIG. 3A is a diagram showing a variation in the distance between transmission and reception units.
Figure 3B:
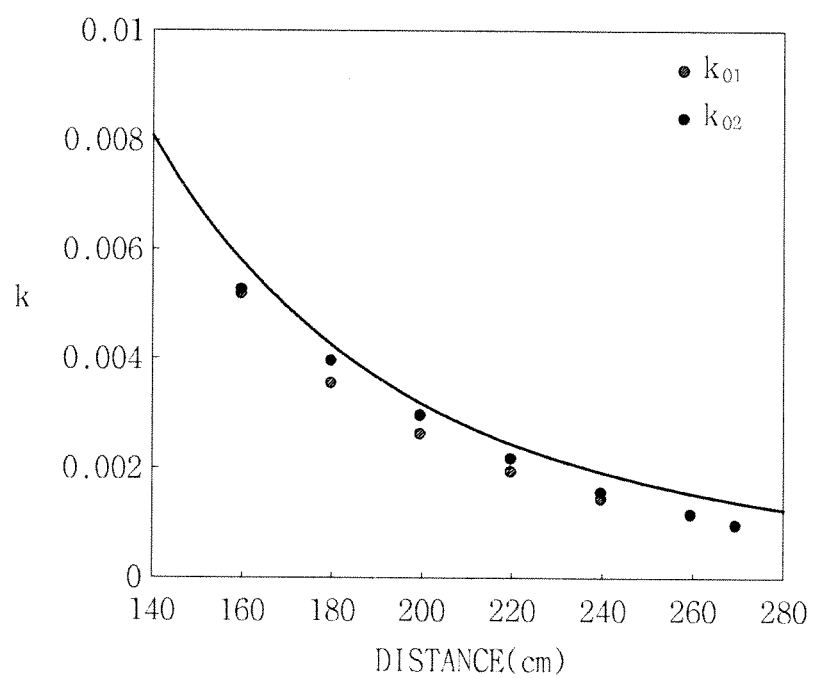
FIG. 3B is a graph showing a magnetic coupling constant k depending on the variation in the distance between the transmission and reception units.

FIG. 3A is a diagram showing the variation in the distance between the transmission and reception units, and FIG. 3B is a graph showing the magnetic coupling constant k depending on the variation in the distance between the transmission and reception units.

Referring to FIGS. 3A and 3B, as the distance between the wireless power transmission and reception units 100 and 200 becomes longer, the magnetic coupling constant k decreases, and thus the input impedance $Z_{in}$ varies in the direction of low impedance.

Such an impedance matching unit 140 may be implemented as a tapped- or multi-load variable transformer, and may perform impedance matching by adjusting the turn ratio of the transformer module.

Figure 4:
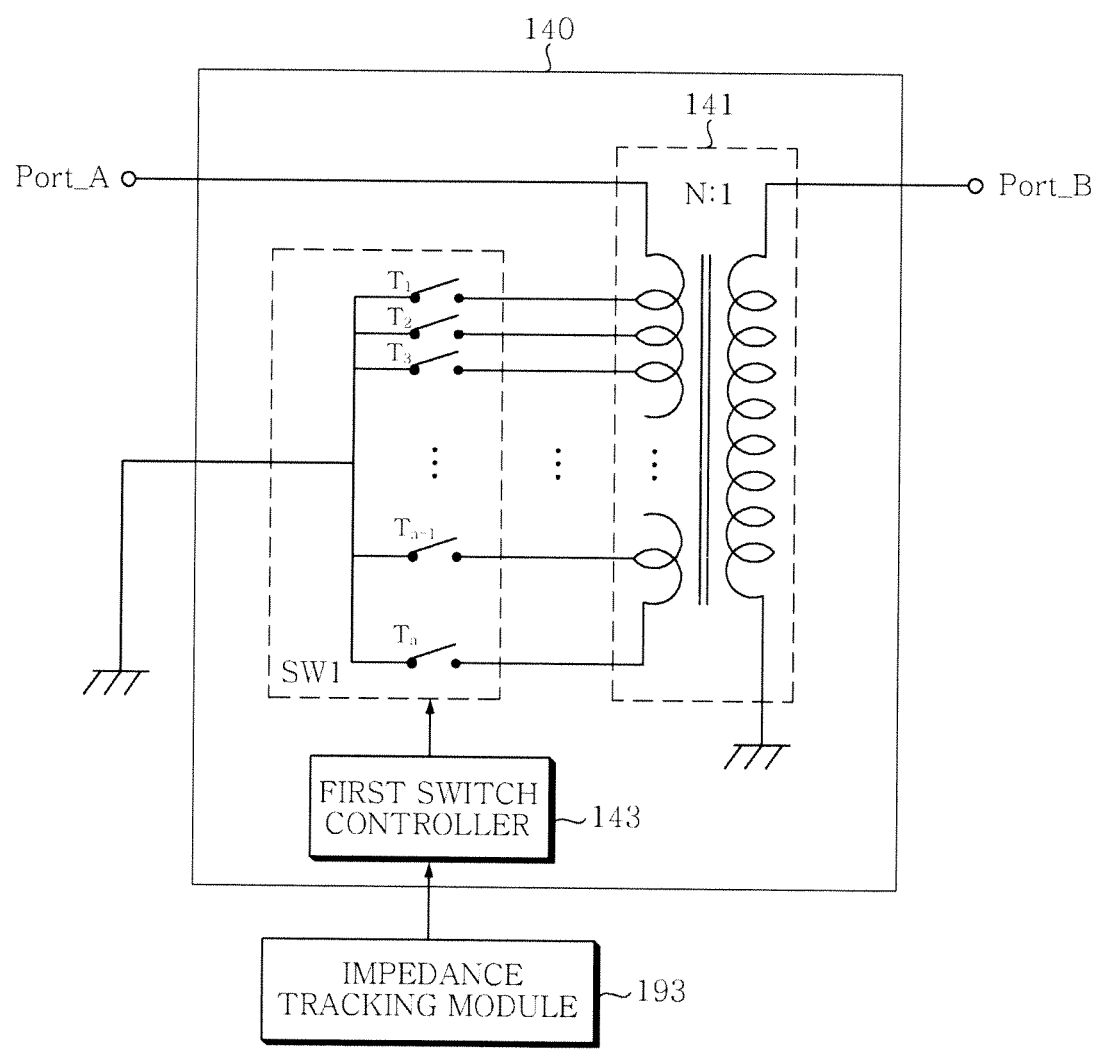
FIG. 4 is a detailed diagram showing the construction of an impedance matching unit implemented as a variable transformer.

An example of such a variable transformer is shown in FIG. 4.

FIG. 4 is a detailed diagram showing the construction of an impedance matching unit implemented as a variable transformer.

Referring to FIG. 4, the impedance matching unit 140 includes a transformer module 141, a plurality of first switches SW1, and a first switch controller 143.

The transformer module 141 is composed of a primary coil N and a secondary coil, the secondary coil being able to be fixed.

The plurality of first switches SW1 are installed on the primary coil N so that the turn ratio of the transformer module 141 can be varied.

The first switch controller 143 is connected to the first switches SW1, and controls the ON/OFF operations of the first switches SW1 under the control of the transmission controller 190 which will be described later (for example, in response to a first control signal provided by the impedance tracking module 193 which will be described later) so that the turn ratio (N:1) of the primary coil N to the secondary coil is varied to perform impedance matching to the optimal impedance.

The terminals $T_1$ to $T_N$ of the first switches SW1 are in a one-to-one correspondence with the to terminals $T_1$ to $T_n$ of the impedance tracking module 193 which will be described later. As a result, the terminal of a first switch, corresponding to output terminal information included in the first control signal which includes information about an output terminal selected by the impedance tracking module 193, among the terminals of the first switches SW1, is turned on in response to the first control signal.

Then, the impedance matching unit 140 performs optimal impedance matching depending on the turn ratio of the transformer module 141 which varies according to the ratio of output power to reflected power based on the variation in the distance between the wireless power transmission and reception units 100 and 200 that is caused by the change in the locations of the transmission and reception units 100 and 200.

In this way, impedance mismatching that occurs due to the variation in the distance between the wireless power transmission and reception units 100 and 200 attributable to the change in the locations thereof may be overcome by varying the transformer module 141 of the impedance matching unit 140.

Figure 5A:
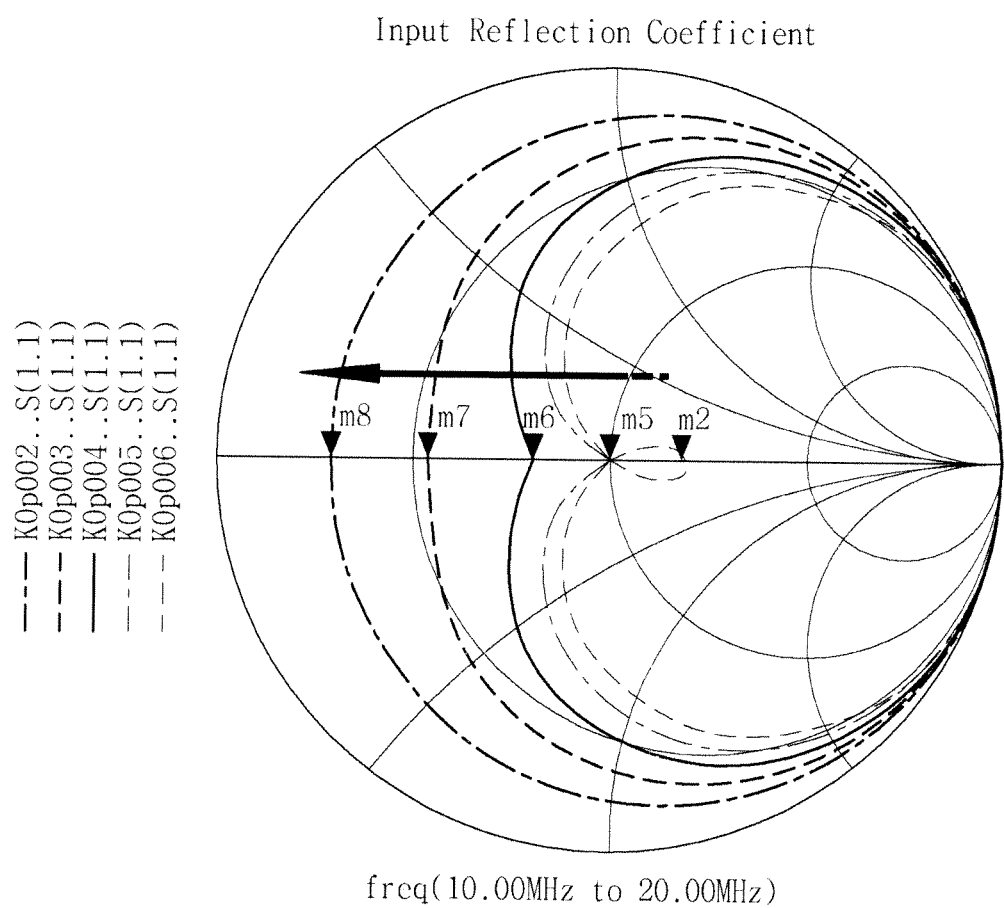
FIG. 5A is a Smith chart showing the input reflection coefficient of transmission energy depending on the magnetic coupling constant k based on the variation in the distance between wireless power transmission and reception units according to the present invention before impedance matching is performed.
Figure 5B:
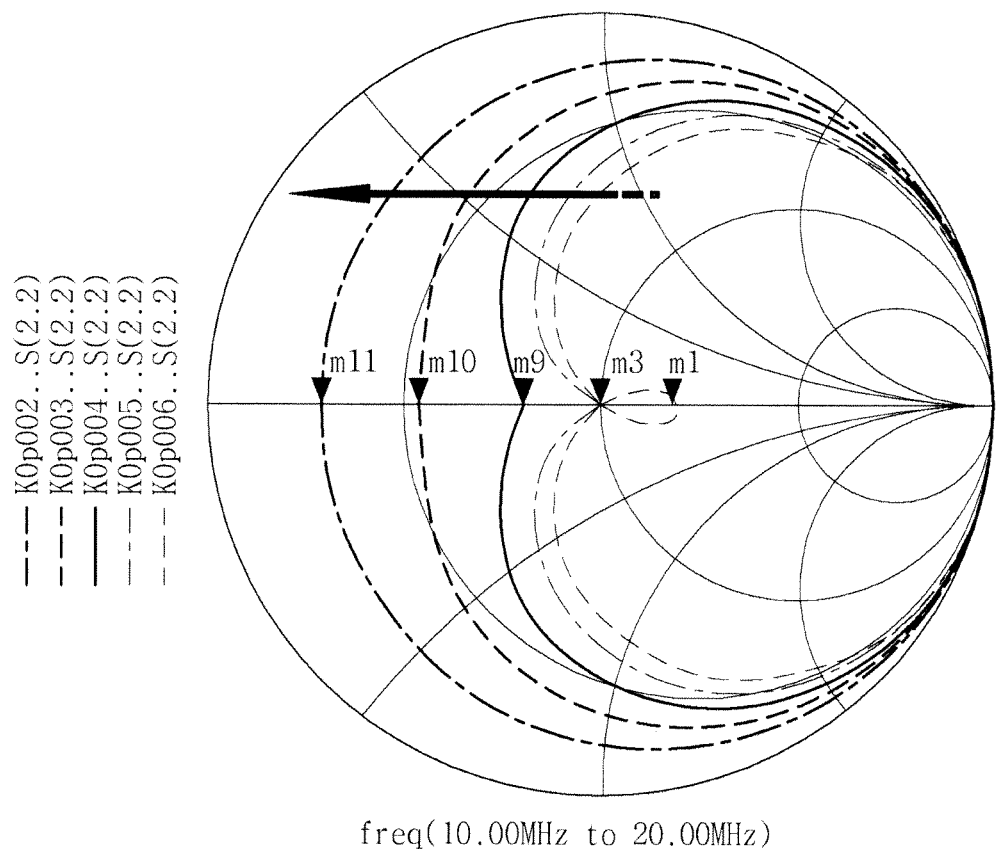
FIG. 5B is a Smith chart showing the output reflection coefficient of transmission energy depending on the magnetic coupling constant k based on the variation in the distance between the wireless power transmission and reception units according to the present invention before impedance matching is performed.

FIG. 5A is a Smith chart showing the input reflection coefficient of transmission energy depending on the magnetic coupling constant k based on the variation in the distance between wireless power transmission and reception units according to the present invention before impedance matching is performed, and FIG. 5B is a Smith chart showing the output reflection coefficient of transmission energy depending on the magnetic coupling constant k based on the variation in the distance between the wireless power transmission and reception units according to the present invention before impedance matching is performed.

Referring to FIGS. 5A and 5B, it can be seen that for both an input side and an output side, as the distance from a center point (for example, m5 and m9 in FIGS. 5A and 5B, respectively) to the marked points increases, the marked points are located farther away from one another.

This means that the loss of transmission energy depending on the magnetic coupling constant k based on the variation in the distance between the wireless power transmission and reception units 100 and 200 is high.

In other words, this means that impedances depending on the variation in the distance between the wireless power transmission and reception units 100 and 200 have not been matched with each other.

Figure 6A:
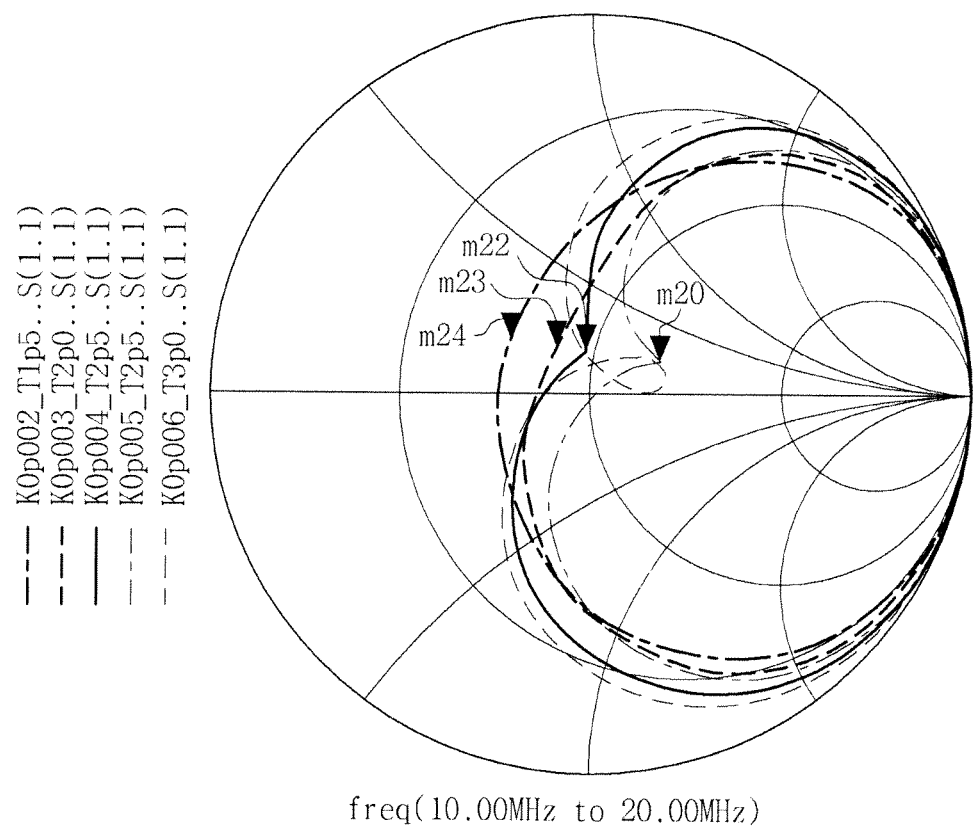
FIG. 6A is a Smith chart showing the input reflection coefficient of transmission energy depending on the magnetic coupling constant k based on the variation in the distance between the wireless power transmission and reception units according to the present invention after impedance matching has been performed.
Figure 6B:
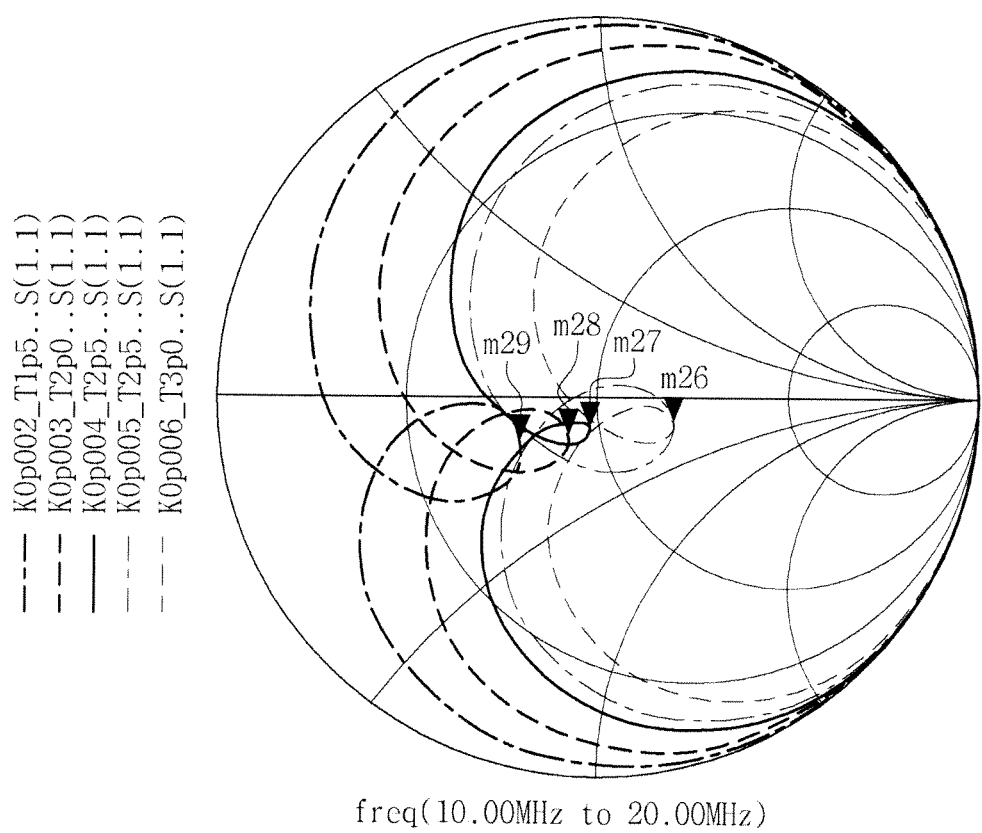
FIG. 6B is a Smith chart showing the output reflection coefficient of transmission energy depending on the magnetic coupling constant k based on the variation in the distance between the wireless power transmission and reception units according to the present invention after impedance matching has been performed.

FIG. 6A is a Smith chart showing the input reflection coefficient of transmission energy depending on the magnetic coupling constant k based on the variation in the distance between the wireless power transmission and reception units 100 and 200 according to the present invention after impedance matching has been performed, and FIG. 6B is a Smith chart showing the output reflection coefficient of transmission energy depending on the magnetic coupling constant k based on the variation in the distance between the wireless power transmission and reception units 100 and 200 according to the present invention after impedance matching has been performed;

Referring to FIGS. 6A and 6B, it can be seen that for both an input side and an output side, marked points are gathered around a center point (for example, m22 and m27 in FIGS. 6A and 6B, respectively).

This means that the loss of transmission energy depending on the magnetic coupling constant k based on the variation in the distance between the wireless power transmission and reception units 100 and 200 is low.

That is, this means that impedances depending on the variation in the distance between the wireless power transmission and reception units 100 and 20 have been matched to each other.

In order to compare insertion loss before and after impedance matching depending on the variation in the distance between the wireless power transmission and reception units 100 and 200 in this way, the following simulation was conducted.

The present simulation was conducted in an experimental environment in which the range of the magnetic coupling constant k depending on the variation in the distance between the wireless power transmission and reception units 100 and 200 is 0.006-0.002, and the turn ratio of the transformer module 141 for impedance matching at that time varies from 1:3 to 1:5.

The following Table 1 summarizes the results of the present simulation.

TABLE 1

| Magnetic coupling constant (k) | Turn ratio | Insertion loss before impedance matching(dB) | Insertion loss after impedance matching |
|---|---|---|---|
| 0.006 | 3 | −0.01 | −0.01 |
| 0.005 | 2.5 | −0.2 | −0.15 |
| 0.004 | 2.5 | −0.22 | −0.1 |
| 0.003 | 2 | −1(80%) | −0.1(98%) |
| 0.002 | 1.5 | −3.1(49%) | −0.15(96%) |

Referring to Table 1, when individual elements before and after impedance matching are compared with respect to each magnetic coupling constant k, it can be seen that insertion loss after impedance matching is lower.

Further, it can be seen that before impedance matching, as the magnetic coupling constant k becomes smaller, that is, as the distance between the wireless power transmission and reception units 100 and 200 becomes longer, the insertion losses increase. In contrast, it can be seen that after impedance matching, insertion losses are about −0.1 [dB] and are almost similar to one another even if the magnetic coupling constant k changes.

This means that when impedance matching is performed by adjusting the turn ratio of the transformer module 141 according to the present invention, insertion loss is almost uniform regardless of variations in the magnetic coupling constant k.

Figure 7A:
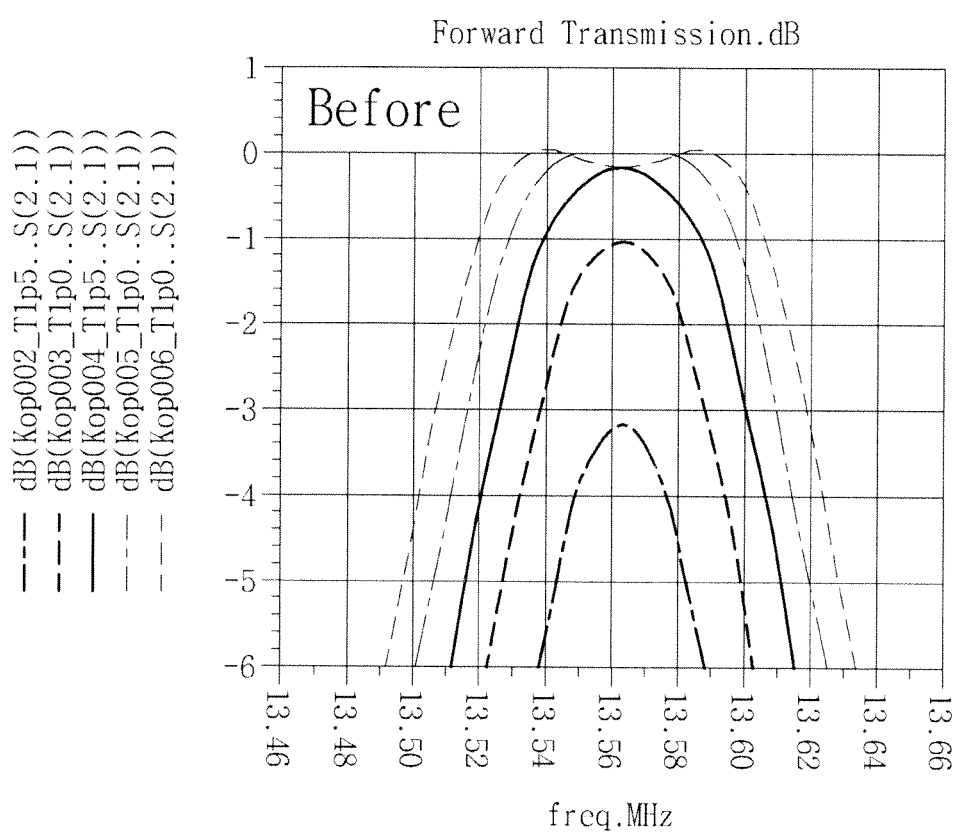
FIG. 7A is a diagram showing the comparison of transfer characteristics before impedance matching is performed by adjusting the turn ratio of a transformer module shown in Table 1.
Figure 7B:
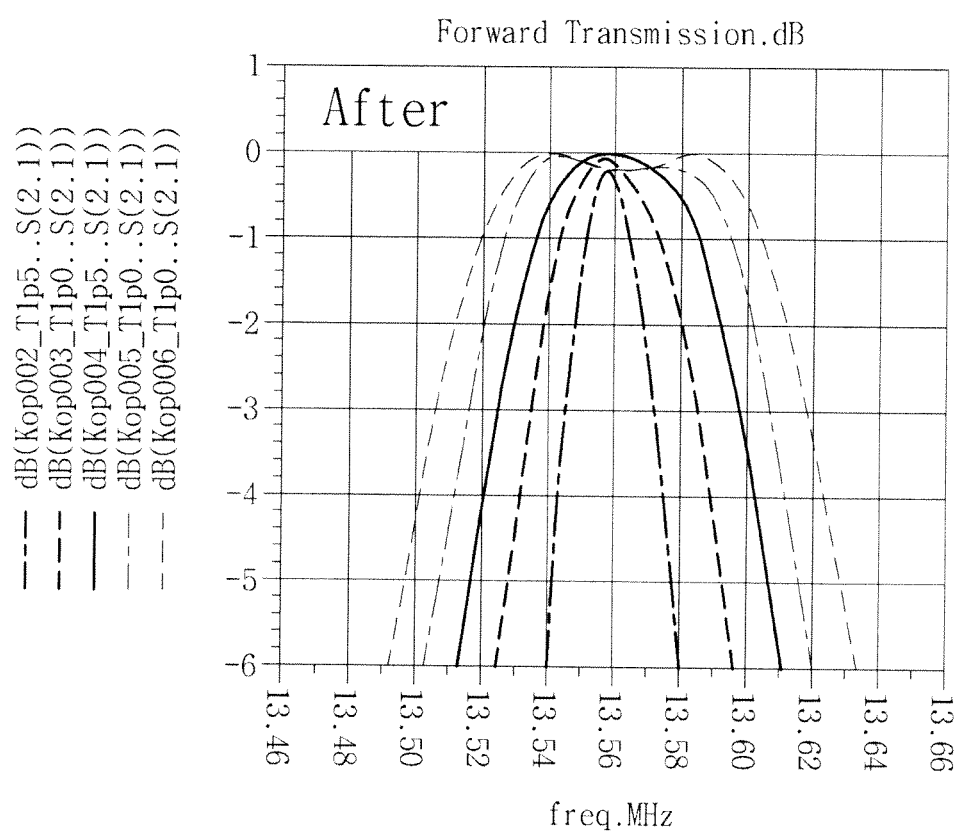
FIG. 7B is a diagram showing the comparison of transfer characteristics after impedance matching has been performed by adjusting the turn ratio of the transformer module shown in Table 1.

Transfer characteristics, indicating insertion loss based on the results of Table 1, can be more definitely understood with reference to the graphs of FIGS. 7A and 7B.

FIG. 7A is a diagram showing the comparison of transfer characteristics before impedance matching is performed by adjusting the turn ratio of the transformer module shown in Table 1, and FIG. 7B is a diagram showing the comparison of transfer characteristics after impedance matching has been performed by adjusting the turn ratio of the transformer module shown in Table 1.

Referring to FIGS. 7A and 7B, it can be seen that in the transfer characteristics before impedance matching is performed by adjusting the turn ratio (N:1) of the transformer module 141 (refer to FIG. 7A), the transfer characteristics appear to differ in respective frequency bands, whereas in the transfer characteristics after impedance matching has been performed (refer to FIG. 7B), the transfer characteristics appear to be almost the same in all frequency bands regardless of the variations in the magnetic coupling constant k.

Therefore, when impedance matching is performed by the impedance matching unit 140 according to the present invention, the transfer characteristics are improved so that almost identical insertion loss is obtained regardless of frequency bands and the variation in the distance between the wireless power transmission and reception units 100 and 200.

Referring back to FIG. 1, the directional power coupler 150 may be installed between the power amplifier 130 and the impedance matching unit 140 or between the impedance matching unit 140 and the first resonant antenna 160.

Such a directional power coupler 150 is composed of a plurality of ports, and changes the direction of an input signal in such a way that a signal input through one port is output through only one of the remaining ports, and is not output through the other remaining ports. In this case, the input signal has predetermined directionality.

The directional power coupler 150 outputs and transfers the wireless power signal input therethrough to the first resonant antenna 160, receives a wireless power signal, reflected from magnetic coupling energy which forms a closed loop (hereinafter referred to as a "reflected wireless power signal"), from the first resonant antenna 160, and outputs the reflected wireless power signal.

For example, the directional power coupler 150 has directionality so that it outputs the wireless power signal, which has been input from the power amplifier 130 or the impedance matching unit 140 through a first port, to the first resonant antenna 160 through a second port, and so that it outputs the reflected wireless power signal, which has been input from the first resonant antenna 160 through the second port, through a third port.

In this way, the directional power coupler 150 may preferably be implemented as a circulator or an isolator having a plurality of ports.

The circulator or isolator has the plurality of ports, but transfers an input signal only in one direction regardless of an input port through which the input signal has been input.

In this case, the power detector 170 for calculating the ratio of output power to reflected power for the purpose of efficiently transmitting wireless power is connected to the directional power coupler 150.

The power detector 170 includes an output power detector 171 and a reflected power detector 173.

The output power detector 171 measures the output power ($P_{out}=P_{detect}$) of the wireless power signal, which has been transferred to the first resonant antenna 160 through the directional power coupler 150 and has been output to the receiving end (for example, a wireless power signal which has been input through the first port of the directional power coupler 150 and has been output through the second port thereof).

Further, the reflected power detector 173 detects the reflected power ($R_{reflect}$) of the reflected wireless power signal which has been input from the first resonant antenna 160 through the directional power coupler 150 and has been output (for example, a reflected wireless power signal which has been input through the second port of the directional power coupler 150 and has been output through the third port).

The output power ($P_{out}=P_{detect}$) and the reflected power ($P_{reflect}$) detected in this way are transferred to the transmission controller 190 which will be described later.

The first resonant antenna 160 includes a variable inductor and a variable capacitor, and is configured such that when the wireless power signal is input, the wireless power signal is converted into magnetic energy via LC resonance occurring due to the varying of inductance and capacitance, and thus a closed loop is formed.

The first resonant antenna 160 functions not only to adjust resonant frequency using LC resonance with the receiving end, but also to perform impedance matching by varying LC values.

The variable voltage regulator 180 receives the output power ($P_{out}=P_{detect}$) detected from the wireless power signal by the output power detector 171 of the power detector 170, and the reflected power ($P_{reflect}$) detected from the reflected wireless power signal by the reflected power detector 173 of the power detector 170, and varies and boosts an input voltage Vin on the basis of the output power-to-reflected power ratio which uses the output power ($P_{out}=P_{detect}$) and the reflected power ($P_{reflect}$). Further, the variable voltage regulator 180 outputs an output voltage Vout divided into a reference voltage and a variable voltage so that the output voltage Vout can be adjusted according to the output power-to-reflected power ratio.

Such a variable voltage regulator 180 transfers the output voltage Vout to the power amplifier 130 so that the wireless power signal is amplified to the maximum output power corresponding to the output power-to-reflected power ratio. A detailed diagram of the variable voltage regulator 180 is shown in FIG. 8.

Figure 8:
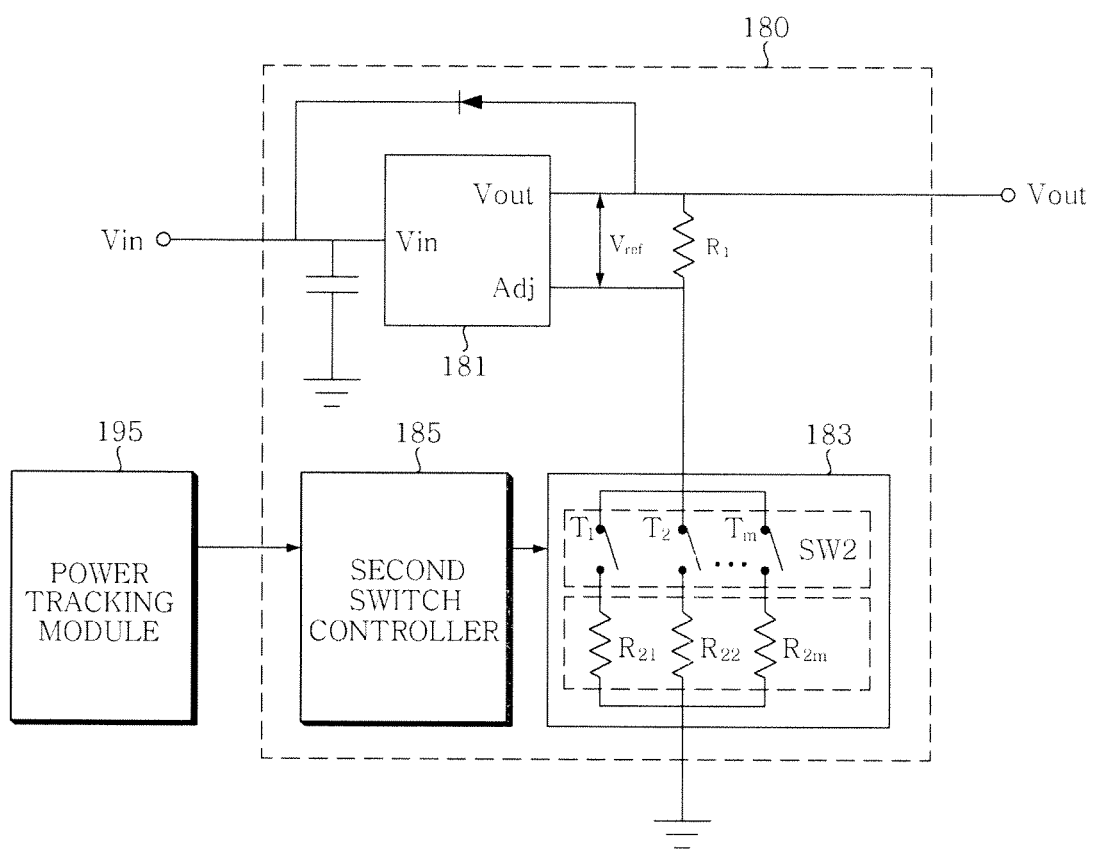
FIG. 8 is a detailed diagram showing the variable voltage regulator of FIG. 1.

FIG. 8 is a detailed diagram showing the variable voltage regulator of FIG. 1.

Referring to FIG. 8, the variable voltage regulator 180 according to an embodiment of the present invention includes a DC-DC converter 181, a first load resistor $R_1$, a resistance adjustment module 183, and a second switch controller 185.

The DC-DC converter 181 varies an input voltage Vin and then outputs a boosted output voltage Vout.

The output voltage Vout of the DC-DC converter 181 is divided into a reference voltage and a variable voltage so that it can be adjusted according to the output power-to-reflected power ratio.

The first load resistor $R_1$ is a fixed resistor, which forms the reference voltage Vref.

The resistance adjustment module 183 is connected between the first load resistor $R_1$ and ground, and includes a plurality of parallel-connected second load resistors $R_{2l}$ to $R_{2m}$ having different resistance values, and a plurality of second switches SW2 connected to the respective second load resistors $R_{2l}$ to $R_{2m}$.

In this case, the variable voltage is formed by a second load resistor selected from among the plurality of second load resistors $R_{2l}$ to $R_{2m}$ according to the output power-to-reflected power ratio.

The second switch controller 185 controls the ON/OFF operations of the second switches SW2 under the control of the transmission controller 190 which will be described later (for example, in response to a second control signal provided by the power tracking module 195 which will be described later) so that a second load resistor corresponding to the output power-to-reflected power ratio is selected from among the plurality of second load resistors $R_{2l}$ to $R_{2m}$.

The terminals $T_1$ to $T_m$ of the second switches SW2 are in a one-to-one correspondence with the terminals $T_1$ to $T_m$ of the power tracking module 195, which will be described later, and thus the terminal of a second switch corresponding to the output terminal information included in the second control signal, among the second switches SW2, is turned on in response to the second control signal which includes information about the output terminal selected by the power tracking module 195.

Then, the variable voltage regulator 180 varies the output voltage Vout according to the value of the second load resistor $R_{2l}$ to $R_{2m}$ selected by the resistance adjustment module 183, as given by the following Equation (5).

$$\text{output voltage }(Vout) = \text{reference voltage }(vref) \times (1 + \text{first load resistor }(R_1)/\text{selected second load resistor }(R_{2m})) \quad (5)$$

That is, the variable voltage regulator 180 provides the maximum output voltage Vout, which varies with the ratio of the resistances of the first load resistor $R_1$ to the second load resistor $R_{2m}$ selected according to the output power-to-reflected power ratio, to the power amplifier 130 in order to amplify the wireless power signal to the maximum output power.

The transmission controller 190 is configured to control the overall operation of the wireless power transmission unit 100 and includes a comparison module 191, an impedance tracking module 193, and a power tracking module 195.

The comparison module 191 of the transmission controller 190 receives the output power ($P_{out}=P_{detect}$) of the wireless power signal and the reflected power ($P_{reflect}$) of the reflected wireless power signal, which are detected by the output power detector 171 and the reflected power detector 173, respectively, and compares the output power-to-reflected power ratio with a preset value, and then determines whether a load device 300 connected to the wireless power reception unit 200 is present.

Such a comparison module 191 controls the power pass switch 120 depending on whether a load device 300 is present, so that when the load device 300 is present, the power pass switch 120 connects the frequency oscillator 110 to the power amplifier 130, and so that when a load device 300 is not present, the power pass switch 120 bypasses the power amplifier 130 and then connects the frequency oscillator 110 to the impedance matching unit 140 (or the directional power coupler 150).

In detail, when the output power-to-reflected power ratio is greater than a preset value (for example, 0.9) in the comparison module 191, the transmission controller 190 determines that a load device 300 connected to the wireless power reception unit 200 is not present, and then controls the power pass switch 120 so that the wireless power signal bypasses the power amplifier 130 and is input to the impedance matching unit 140 (or the directional power coupler 150).

In contrast, when the output power-to-reflected power ratio is less than the preset value, the transmission controller 190 determines that the load device 300 connected to the wireless power reception unit 200 is present, and then controls the power pass switch 120 such that the wireless power signal generated by the frequency oscillator 110 is input to the power amplifier 130.

The impedance tracking module 193 of the transmission controller 190 controls the impedance matching unit so that when the load device 300 is present, impedance automatically varies and optimal impedance is then tracked depending on the output power-to-reflected power ratio based on the variation in the distance to the load device 300.

The impedance tracking module 193 controls the first switch controller 143 for controlling the ON/OFF operations of the plurality of first switches SW1 so that the turn ratio (N:1) of the transformer module 141 can be adjusted in order for the impedance matching unit 140 to vary impedance depending on the output power-to-reflected power ratio.

Figure 9:
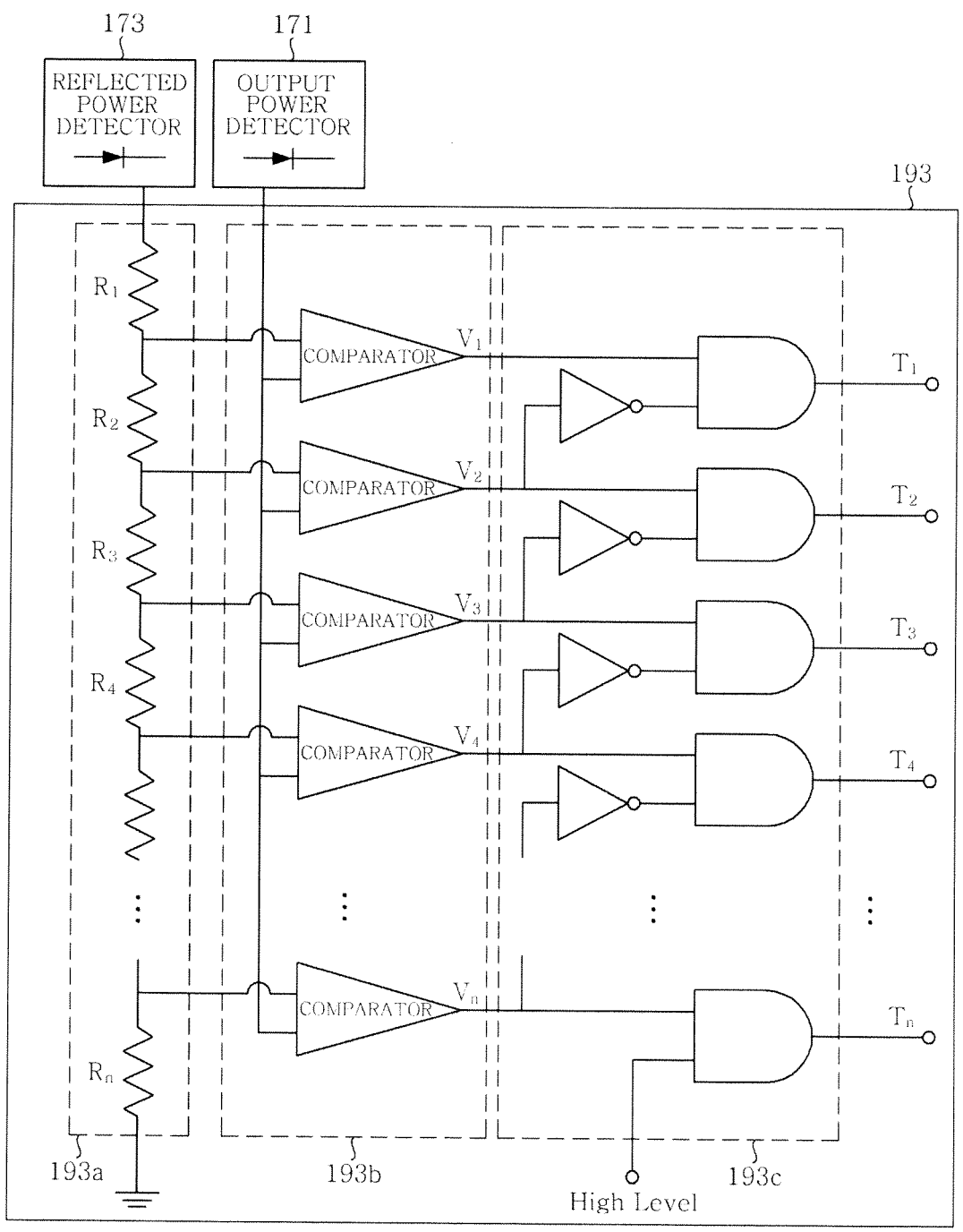
FIG. 9 is a circuit diagram showing an example of the impedance tracking module of FIG. 1.

FIG. 9 is a circuit diagram showing an example of the impedance tracking module of FIG. 1.

Referring to FIG. 9, the impedance tracking module 193 has two input terminals through which the output power ($P_{out}=P_{detect}$) and the reflected power ($P_{reflect}$) detected by the power detector 170 are input, and a plurality of output terminals $T_1$ to $T_n$ through which reflected voltages converted into levels depending on the output power-to-reflected power ratio are respectively output. Further, the impedance tracking module 193 is configured to include a first voltage division circuit 193a, a first comparison circuit 193b, and a first output terminal selection circuit 193c between the two input terminals and the plurality of output terminals $T_1$ to $T_n$.

The first voltage division circuit 193a includes a plurality of series-connected resistors R1 to Rn having different resistance values between a reflected voltage detected from the reflected power $R_{reflect}$ and the ground, and is configured such that the reflected voltage is divided into a plurality of reflected voltages by the plurality of resistors R1 to Rn.

The first comparison circuit 193b includes a plurality of comparators which respectively receive the plurality of reflected voltages output from the first voltage division circuit 193a and the output voltage detected from the output power ($P_{out}=P_{detect}$), and respectively determine whether the reflected voltages are at levels lower than or higher than the output voltage using the comparison of the voltages. By means of the plurality of comparators, the reflected voltages are converted into levels.

Here, the output voltage to be compared to the reflected voltages may be set to a separate reference voltage.

The first output terminal selection circuit 193c allows one high-level reflected voltage of the plurality of reflected voltages which are converted into levels by the first comparison circuit 193b, to be output through one of the plurality of output terminals $T_1$ to $T_n$.

Such a first output terminal selection circuit 193c includes a plurality of AND gates, the input terminals of which are connected to the respective comparators, and the output terminals of which are connected to the respective output terminals $T_1$ to $T_n$, and a plurality of inverters, which are connected to respective first input terminals of the input terminals of the AND gates.

In this case, such an inverter is connected to one of the two input terminals of a corresponding AND gate and is configured to invert a reflected voltage, converted into a level by a corresponding one of the comparators, and to input the inverted voltage to the AND gate. The AND gate is operated to output an input reflected voltage through a corresponding output terminal $T_1$ to $T_n$ only when both of the two inputs, that is, the reflected voltage converted into the level and the inverted reflected voltage output from the inverter, are at high levels.

In detail, in the impedance tracking module 193, when reflected voltages $V_1$ and $V_2$ output from the voltage division circuit 193a are converted into levels by the comparison circuit 193b, and then the reflected voltage $V_1$ is output as a high level and the reflected voltages $V_2$ to $V_n$ are output as low levels, the reflected voltage $V_1$ is input to one of the input terminals of the AND gate as the high level and the voltage $V_2$ is inverted into a high level by the inverter and is then input to the other of the input terminals of the AND gate in the output terminal selection circuit 193c.

Then, since both the reflected voltages $V_1$ and $V_2$ which are input to the AND gate are at high levels, the reflected voltage $V_1$ is output through a relevant output terminal $T_1$ of the output terminals $T_1$ to $T_n$.

If both the reflected voltages $V_1$ and $V_2$ converted into levels by the comparison circuit 193b are at high levels, and all of the remaining reflected voltages $V_3$ to $V_n$ are at low levels, the voltage $V_2$ is output through the output terminal $T_2$.

Meanwhile, each AND gate may be replaced by a NOR gate. When the NOR gate is used, methods of individually outputting differently divided voltages through one output terminal are the same as that of the AND gate, as described above, except that only when both of the two reflected voltages input to the NOR gate are at low levels, the input reflected voltage is output through a corresponding output terminal $T_1$ to $T_n$ in the case of the NOR gate.

The truth table of the circuit diagram of the impedance tracking module 193 operating in this manner is summarized in Table 2.

TABLE 2

| $V_1$ | $V_2$ | $V_3$ | $V_4$ | $V_{n-1}$ | $V_n$ | selected output terminal |
|---|---|---|---|---|---|---|
| H | H | H | H | H | H | $T_n$ |
| . | . | . | . | . | . | . |
| . | . | . | . | . | . | . |
| . | . | . | . | . | . | . |
| H | H | H | H | H | L | $T_4$ |
| H | H | H | L | L | L | $T_3$ |
| H | H | L | L | L | L | $T_2$ |
| H | L | L | L | L | L | $T_1$ |

As indicated in Table 2, the impedance tracking module 193 provides a first control signal, including information about one output terminal selected by the first output terminal selection circuit 193c, to the impedance matching unit 140 to control the impedance matching unit 140.

In this case, the output terminals $T_1$ to $T_n$ are in a one-to-one correspondence with the terminals of the first switches SW1 of the impedance matching unit 140.

Then, among the terminals of the plurality of first switches SW1 of the impedance matching unit 140, the terminal of a first switch corresponding to the output terminal information included in the first control signal is turned on, so that the turn ratio of the transformer module 141 is adjusted, thus tracking optimal impedance to be matched depending on the output power-to-reflected power ratio.

The power tracking module 195 of the transmission controller 190 controls the variable voltage regulator 180 so that when a load device 300 is present, the maximum output power is tracked by automatically varying the output power, attributable to the variation in the distance to the load device 300, depending on the output power-to-reflected power ratio.

Such a power tracking module 195 controls the second switch controller 185 for controlling the ON/OFF operations of the plurality of second switches SW2 so that the output voltage Vout is adjusted depending on the ratio of the resistances of the first load resistor $R_1$ of the variable voltage regulator 180 to a second load resistor selected from among the plurality of second load resistors $R_{21}$ to $R_{2m}$ of the resistance adjustment module 183 so as to amplify the output power of the wireless power signal depending on the output power-to-reflected power ratio.

Figure 10:
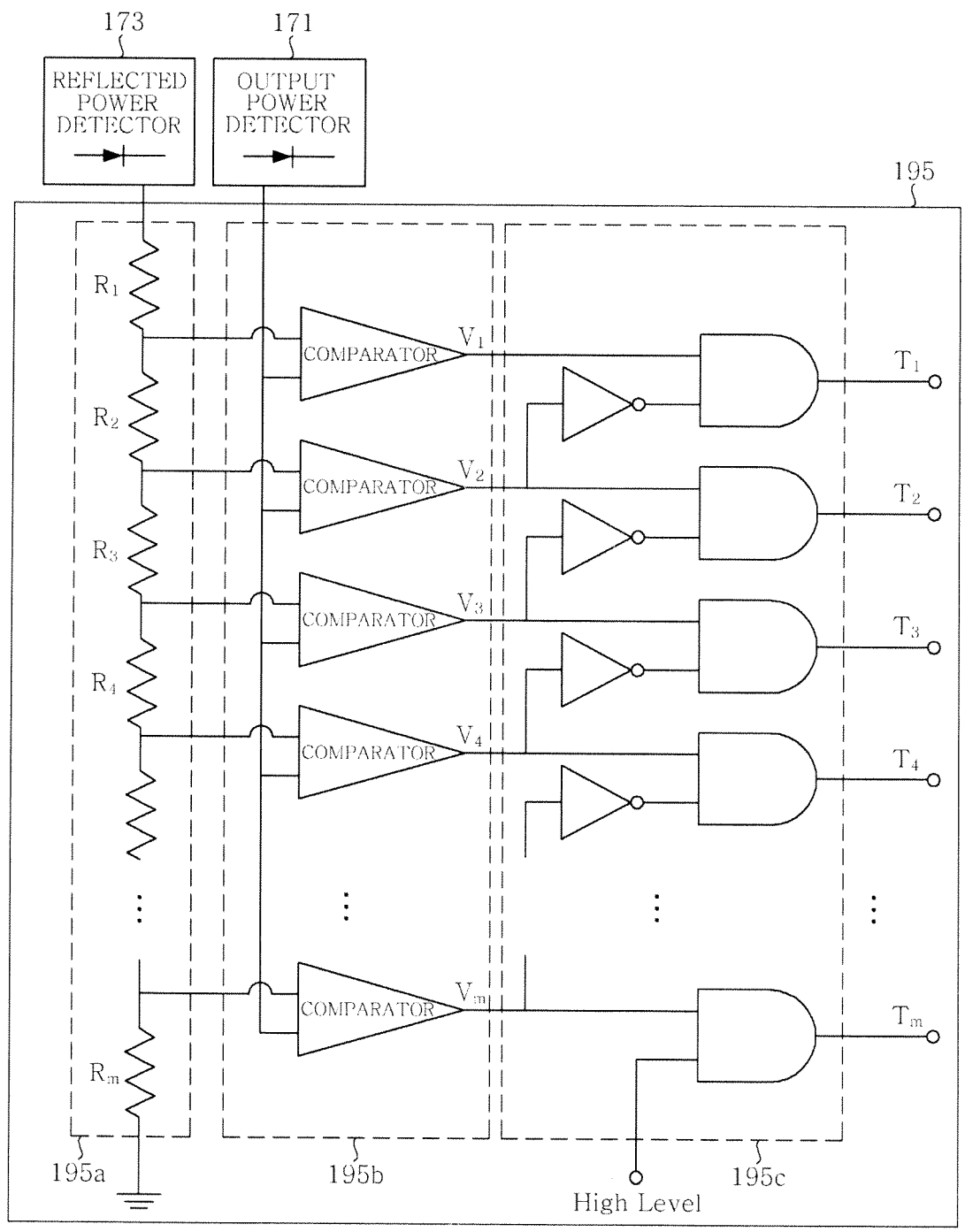
FIG. 10 is a circuit diagram showing an example of the power tracking module of FIG. 1.

FIG. 10 is a circuit diagram showing an example of the power tracking module of FIG. 1.

Referring to FIG. 10, the power tracking module 195 has two input terminals through which the output power ($P_{out}=P_{detect}$) and the reflected power ($P_{reflect}$) detected by the power detector 170 are input, and a plurality of output terminals $T_1$ to $T_m$ through which reflected voltages converted into levels depending on the output power-to-reflected power ratio are respectively output. Further, the power tracking module 195 is configured to include a second voltage division circuit 195a, a second comparison circuit 195b, and a second output terminal selection circuit 195c between the two input terminals and the plurality of output terminals $T_1$ to $T_m$.

Since the circuit diagram of the example of the power tracking module 195 shown in FIG. 9 has the same construction and is operated using the same method as the circuit diagram of the impedance tracking module 193 of FIG. 1, a detailed description of the components thereof will be replaced by the above description.

However, the power tracking module 195 provides a second control signal, which includes information about one output terminal selected by the second output terminal selection circuit 195c, to the variable voltage regulator 180 to control the variable voltage regulator 180.

In this case, the output terminals $T_1$ to $T_m$ are in a one-to-one correspondence with the terminals of the plurality of second switches SW2 of the variable voltage regulator 180.

Then, the output voltage Vout is adjusted depending on the ratio of the resistances of the second load resistor, selected when the terminal of a second switch corresponding to the output terminal to information included in the second control signal among the terminals of the plurality of second switches SW2 of the variable voltage regulator 180 is turned on, and the first load resistor, thus tracking the maximum output voltage, at which amplification is to be performed, depending on the output power-to-reflected power ratio.

Next, the construction and operation of the wireless power reception unit 200 according to an embodiment of the present invention will be described in detail.

Referring back to FIG. 1, the second resonant antenna 210 includes a variable inductor and a variable capacitor, and is configured to convert an input signal into magnetic energy that forms a closed loop via LC resonance by varying inductance and capacitance, and magnetically couples the magnetic energy to the magnetic energy formed by the wireless power transmission unit 100.

Since the magnetic coupling energy formed in this way also forms a closed loop, a wireless power signal converted from the magnetic coupling energy is received using magnetic resonance.

Next, the second resonant antenna 210 supplies a wireless power signal transmitted from the wireless power transmission unit 100 to the load device 300 connected to the wireless power reception unit 200, and reflects a reflected wireless power signal towards the wireless power transmission unit 200.

As shown in FIG. 3, the second resonant antenna 210 has the same construction as the above-described first resonant antenna 160, and thus a detailed description thereof is replaced by the above-description.

The switch 220 is disposed between the second resonant antenna 210 and the rectifier 230, and performs switching such that the second resonant antenna 210 is magnetically coupled to or is disconnected from the wireless power transmission unit 100.

In other words, the switch 220 determines the reception standby state or the reception termination state of the wireless power reception unit 200.

When the switch 220 is turned on, the wireless power reception unit 200 receives a wireless power signal, whereas when the switch 220 is turned off, the wireless power reception unit 200 stops receiving the wireless power signal.

For example, the switch 220 performs switching such that when the load device 200 connected to the wireless power reception unit 200 does not require power any more (for example, when a battery has completed charging or when an electronic/electric home appliance such as a television or a computer is turned off), magnetic coupling to the wireless power transmission unit 100 is terminated, or such that, in contrast, when the load device 300 connected to the wireless power reception unit 200 requires power (for example, when a battery starts charging or when an electronic/electric home appliance such as a TV or a computer is turned on), magnetic coupling to the wireless power transmission unit 100 is initiated.

The rectifier 230 rectifies the wireless power signal received from the second resonant antenna 210.

The power signal converter 240 is connected to the load device 300 and is configured to convert the wireless power signal rectified by the rectifier 230 into a suitable DC signal or AC signal so that the power unit (not shown) of the load device 300 is charged with power, or power for home use is supplied to the load device 300.

For example, when the power unit of the load device 200 connected to the power signal converter 240 employs a scheme in which the power unit is charged with the power for a predetermined period of time and stores a predetermined capacity as in the case of a battery charger, the power signal converter 240 converts the received wireless power signal into a suitable DC signal so as to charge the power unit of the load device 300 with the power.

In this case, the wireless power reception unit 200 to which the load device 300 is connected may further include a battery capacity detector (not shown) capable of detecting the capacity of the battery charger. Therefore, the wireless power reception unit 200 transfers the signal detected by the battery capacity detector (not shown) to the reception controller 260 of the wireless power reception unit 200.

Further, when the power unit of the load device 300 employs a scheme in which the power unit must continuously supply power as in the case of an electronic/electric home appliance, the power signal converter 240 converts the received wireless power signal into a suitable AC signal so as to supply power for home use to the power unit of the load device 300.

Therefore, the power signal converter 240 may include an AC converter (AC-AC converter) (not shown) for converting the received wireless power signal into a suitable AC signal, an AC-DC converter to (not shown) for converting the received wireless power signal into a suitable DC signal, etc.

The charging circuit 250 is a circuit for performing charging with the power converted by the power signal converter 240. As shown in FIG. 1, the charging circuit 250 may be included in the wireless power reception unit 200, but is not limited to this structure, and the charging circuit 250 may be included in the load device 300.

The reception controller 260 controls the overall operation of the wireless power reception unit 200.

In detail, the reception controller 260 performs control such that the second resonant antenna 210 receives the wireless power signal using magnetic resonance to allow power to be supplied to the load device 300, and such that the second resonant antenna 210 reflects the reflected wireless power signal towards the wireless power transmission unit 100.

Further, the reception controller 260 performs control such that the switch 220 performs ON/OFF switching based on the battery capacity received from the battery capacity detector or such that the switch 220 performs ON/OFF switching depending on whether a load device 300 is being connected to the wireless power reception unit.

Figure 11:
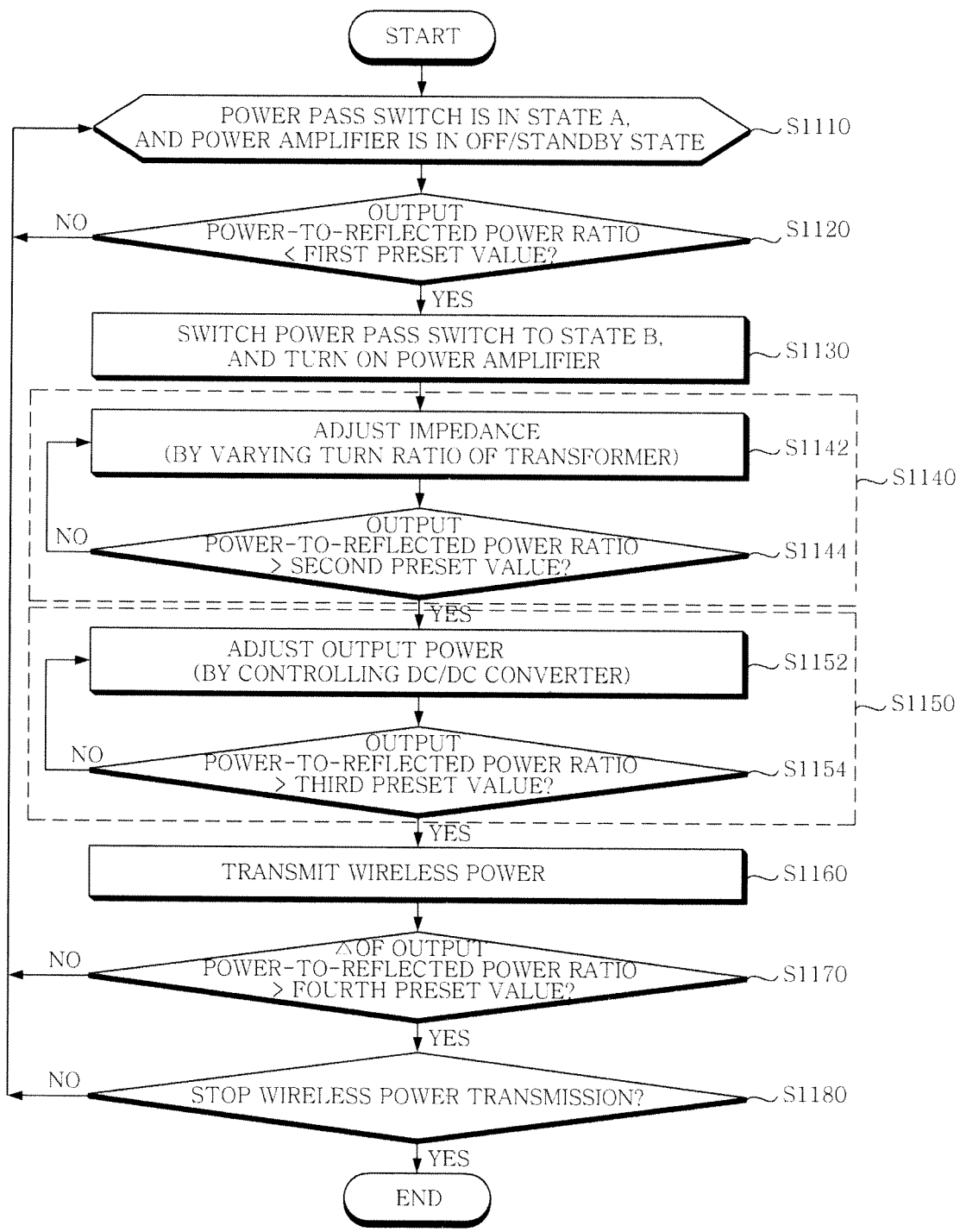
FIG. 11 is a flowchart showing the operation of the wireless power transmission unit according to an embodiment of the present invention.

FIG. 11 is a flowchart showing the operation of the wireless power transmission unit according to an embodiment of the present invention.

Referring to FIG. 11, when the wireless power transmission unit 100 is turned on, the power pass switch 120 is initially in state A, and the power amplifier 130 is initially in an off state or a standby state (S1110).

Here, the state A refers to the state in which the power pass switch 120 is in a bypass state, wherein the wireless power signal generated by the frequency oscillator 110 bypasses the power amplifier 130 and is switched to the impedance matching unit 140 (or the directional power coupler 150) without being switched to the power amplifier 130.

Accordingly, when the power pass switch 120 is in the state A, no signal is input to the power amplifier 130, and thus the power amplifier 130 is in an OFF state or a standby state.

Such a wireless power transmission unit 100 determines whether an output power-to-reflected power ratio is less than a first preset value, in order to determine whether a load device 300 connected to the wireless power reception unit 200 is present (S1120).

Here, the output power-to-reflected power ratio refers to the degree (ratio) of variations in the output power ($P_{out}=P_{detect}$) to the reflected power ($P_{reflect}$) (hereinafter referred to as an "output power-to-reflected power ratio").

The wireless power signal, which is generated by the frequency oscillator 110, bypasses the power amplifier 130 through the power pass switch 120 in the state A, undergoes impedance matching without being amplified, and is then transmitted to the reception unit 200 through the first resonant antenna 160. In this case, the output power ($P_{out}=P_{detect}$) is detected from that transmitted wireless power signal.

The reflected power ($P_{reflect}$) is detected from a reflected wireless power signal which returns from the wireless power reception unit 200 after the wireless power signal has been transmitted.

It is determined based on the output power ($P_{out}=P_{detect}$) and the reflected power ($P_{reflect}$) detected in this way whether the output power-to-reflected power ratio is less than the first preset value (S1120), and thus it is then determined whether a load device 300 connected to the wireless power reception unit 200 is present.

For example, the output power-to-reflected power ratio being '1' means that the output power ($P_{out}=P_{detect}$) is identical to the reflected power ($P_{reflect}$).

That is, this means that 100% of the wireless power signal that was transmitted to the wireless power reception unit 200 returns, and thus it can be determined that a load device 300 connected to the wireless power reception unit 200 is not present.

However, in practice, the output power-to-reflected power ratio cannot be '1' due to loss in air or the like.

Therefore, in S1120, it is preferable that the first preset value be the maximum value of the output power-to-reflected power ratio that can be measured when no load device 300 is connected to the wireless power reception unit 200, in consideration of loss in the air or the like.

If the output power-to-reflected power ratio is less than the first preset value (for example, 0.9) in S1120, it is determined that a load device 300 connected to the wireless power reception unit 200 is present, and the power pass switch 120 is switched to state B (S1130). Further, in S1130, when the wireless power signal generated by the frequency oscillator 110 is input to the power amplifier 130 by the power pass switch 120, the power amplifier 130 is turned on, and thus the wireless power signal is amplified at the intensity of the power corresponding to the output power-to-reflected power ratio.

Here, the state B refers to the state in which the power pass switch 120 is switched to the power amplifier 130.

If the output power-to-reflected power ratio is equal to or greater than the first preset value (for example, 0.9) in S1120, the process returns to operation S1110 where the power pass switch 120 is maintained in the state A, and the power amplifier 130 is continuously maintained in an OFF state or in a standby state.

In this way, since the power amplifier 130 can be turned on or off by the power pass switch 120 depending on the circumstances, unnecessary power consumption can be reduced.

Meanwhile, after S1130, since the load device 300 connected to the wireless power reception unit 200 is present, the following operations are performed: an operation S1140 of tracking impedance and an operation S1150 of tracking an output voltage when the distance between the wireless power transmission unit 100 and the load device 300 connected to the wireless power reception unit 200 varies due to a change in the predetermined locations thereof.

FIG. 11 shows the construction in which after the impedance tracking operation S1140, the output voltage tracking operation S1150 is sequentially performed, but the operations may be sequentially performed in reverse order. In addition, the impedance tracking operation S1140 and the output voltage tracking operation S1150 may also be simultaneously performed.

First, the impedance matching operation S1140 includes an operation S1142 of adjusting impedance by adjusting the turn ratio of the transformer module 141 of the impedance matching unit 140 so as to match impedances that are varying depending on the change in the predetermined locations of the wireless power transmission unit 100 and the load device 300 connected to the wireless power reception unit 200, and an operation S1144 of determining whether the output power-to-reflected power ratio is greater than a second preset value.

The operation S1142 is performed to adjust impedance in such a way that one selected from among the plurality of output terminals $T_1$ to $T_n$ by the impedance tracking module 193 depending on the output power-to-reflected power ratio is connected to the terminal of a relevant one of the plurality of first switches SW1 for adjusting the turn ratio of the transformer module 141 to perform switching.

Next, the operation S1144 is configured to determine whether the output power-to-reflected power ratio is greater than the second preset value. In this case, the second preset value may preferably be the maximum value of the output power-to-reflected power ratio depending on the distance between the wireless power transmission unit 100 and the load device 300 connected to the wireless power reception unit 200.

That is, output power-to-reflected power ratios measured in the optimal impedance matching states depending on the distances between the wireless power transmission unit 100 and the load device 300 connected to the wireless power reception unit 200 are previously set.

If the maximum value of the output power-to-reflected power ratio is set to 0.7 in the state in which the wireless power transmission unit 100 and the load device 300 connected to the wireless power reception unit 200 are spaced apart from each other by a predetermined distance (for example, 30 cm), the second preset value is designated as 0.7.

Then, if, in operation S1144, the output power-to-reflected power ratio is greater than 0.7, it is determined that optimal impedance matching has been performed, and then the wireless power signal is transmitted to the wireless power reception unit 200.

In contrast, if, in operation S1144, the output power-to-reflected power ratio is equal to or less than 0.7, it is determined that optimal impedance matching has not been performed, and then the process returns to operation S1142 so as to realize optimal impedance matching, thus adjusting impedance.

In the impedance matching operation S1140, the impedance adjustment operation S1142 is repeatedly performed until the conditions in operation S1144 are satisfied so as to realize optimal impedance matching.

Similarly, the output voltage tracking operation S1150 includes an operation S1152 of adjusting the output voltage by adjusting the resistance of the resistance adjustment module 183 of the variable voltage regulator 180 so as to adjust the output voltage which varies depending on a change in predetermined locations of the wireless power transmission unit 100 and the load device 300 connected to the wireless power reception unit 200, and an operation S1154 of determining whether the output power-to-reflected power ratio is greater than a third preset value.

The operation S1152 is performed to adjust the output voltage of the variable voltage regulator 180 in such a way that one selected from among the plurality of output terminals $T_1$ to $T_m$ by the power tracking module 195 depending on the output power-to-reflected power ratio is connected to the terminal of a relevant one of the plurality of second switches SW2 for adjusting the resistance of the resistance adjustment module 183 to perform switching.

Next, operation S1154 is configured to determine whether the output power-to-reflected power ratio is greater than a third preset value. Here, the third preset value may preferably be the maximum value of the output power-to-reflected power ratio depending on the distance between the wireless power transmission unit 100 and the load device 300 connected to the wireless power reception unit 200.

That is, the maximum values of output power-to-reflected power ratio measured in the states in which the maximum output voltages are obtained depending on the distances between the wireless power transmission unit 100 and the load device 300 connected to the wireless power reception unit 200 are previously set.

If the maximum value of the output power-to-reflected power ratio is set to 0.7 in the state in which the wireless power transmission unit 100 and the load device 300 connected to the wireless power reception unit 200 are spaced apart from each other by a predetermined distance (for example, 30 cm), the second preset value is designated as 0.7.

Then, if, in operation S1154, the output power-to-reflected power ratio is greater than 0.7, it is determined that the output voltage is the maximum voltage, and then the maximally amplified wireless power signal is transmitted to the wireless power reception unit 200 (S1160).

In contrast, if, in operation S1154, the output power-to-reflected power ratio is equal to or less than 0.7, it is determined that the output voltage is not the maximum voltage, and then the process returns to operation S1152 where the resistance value is controlled so as to obtain the maximum output voltage, thus adjusting the output voltage.

In the voltage tracking operation S1150, the output voltage adjustment operation S1152 is repeatedly performed until the conditions in operation S1154 are satisfied so as to obtain the maximum output voltage.

After operations S1140 and S1150 have been performed, the wireless power signal is transmitted to the wireless power reception unit 200 in the optimal state (S1160).

In this case, the wireless power transmitted to the wireless power reception unit 200 is used to charge the load device 300 connected to the wireless power reception unit 200. As the load device 300 is gradually charged with the wireless power, a variation A in the output power-to-reflected power ratio gradually decreases. Accordingly, after the charging has been completed, the variation A in the output power-to-reflected power ratio will be '0'.

Therefore, whether the variation A in the output power-to-reflected power ratio is greater than a fourth preset value is determined (S1170), and thus whether to stop transmitting the wireless power signal is determined (S1180).

Here, the fourth preset value may preferably be the minimum value of the variation Δ in the output power-to-reflected power ratio when the load device 300 completes charging.

For example, when the load device 300 completes charging, if the minimum value of the variation Δ in the output power-to-reflected power ratio is 0, the fourth preset value is designated as '0'.

In this case, when the variation Δ in the output power-to-reflected power ratio is greater than the fourth preset value (for example, 0) in operation S1170, it is determined that the load device 300 does not yet complete charging, and it is determined whether a stop signal required to stop transmitting the wireless power signal has been input (S1180).

In contrast, when the variation Δ in the output power-to-reflected power ratio is equal to or less than the fourth preset value (for example, 0) in operation S1170, it is determined that the load device 300 has completed charging, and the process returns to operation S1110 where the power amplifier is in a standby state.

Meanwhile, if it is determined in S1180 that the stop signal has been input, the transmission of the wireless power signal stops, whereas if it is determined in S1180 that the stop signal has not been input, the process returns to operation S1110 where the power amplifier is in a standby state.

FIG. 12 is a flowchart showing the operation of the wireless power reception unit according to an embodiment of the present invention.

The operation of the wireless power reception unit 200 will be described with reference to FIG. 12. When the wireless power reception unit 200 is turned on (S1210), a wireless power signal transmitted from the transmitting unit is received using magnetic resonance through the second resonant antenna 210 (S1220).

Next, after the received wireless power signal is rectified by the rectifier 230 (S1230), the form of the wireless power signal is converted from AC into AC or from AC into DC by the power signal converter 240 so that suitable power is supplied depending on a load device 300 connected to the wireless power reception unit 200 (S1240), and the converted wireless power is supplied to the load device 300 (S1250).

Thereafter, whether the load device 300 has completed charging or whether the load device 300 has been turned off to interrupt the supply of power is determined (S1260). Based on the results of the determination, the wireless power received from the wireless power reception unit 200 is continuously supplied to the load device 130, or the switch is turned off to stop receiving the wireless power (S1270).

As described above, the present invention is advantageous in that since a transmission device can be aware of a reception environment without requiring separate communication equipment or a separate communication system, the cost required for a wireless power transmission/reception apparatus can be lowered, and the construction and control of the apparatus can be simplified.

Further, the present invention is advantageous in that since impedance and output power can be automatically adjusted to optimal impedance and maximum output power, respectively, depending on a variation in the distance between a transmitting end and a receiving end, an optimal wireless power transmission environment is provided even under narrow-band resonance characteristics between the transmitting end and the receiving end, thus maximizing transmission efficiency.

Furthermore, the present invention is advantageous in that unnecessary power consumption can be reduced because a power pass switch and a power amplifier enabling ON/OFF control are used.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A wireless power transmission/reception apparatus, comprising:
    a wireless power transmission unit configured to:
    receive externally input power,
    generate a wireless power signal to be transmitted in a wireless manner,
    transmit the generated wireless power signal using magnetic resonance,
    receive a reflected wireless power signal,
    determine whether a load device is present, and
    transmit a further wireless power signal when it is determined that the load device is present in such a way that variations in impedance and output power depending on a variation in a distance to the load device are tracked, and the further wireless power signal, which has been matched to an optimal impedance and which has been amplified to a maximum level of output power, is transmitted in a wireless manner to allow power to be supplied to the load device; and a wireless power reception unit connected to the load device, and configured to receive the wireless power signal from the wireless power transmission unit using magnetic resonance, to provide the wireless power signal to the load device connected to the wireless power reception unit, and to reflect the reflected wireless power signal, which was not consumed, towards the wireless power transmission unit, wherein the wireless power transmission unit comprises:

a frequency oscillator configured to receive the externally input power and generating a wireless power signal desired to be transmitted;

a power amplifier configured to amplify the wireless power signal generated by the frequency oscillator and output an amplified wireless power signal;

a first resonant antenna configured to transmit the wireless power signal using magnetic resonance, and receive the reflected wireless power signal that is reflected from the wireless power reception unit using magnetic resonance;

an impedance matching unit disposed between the power amplifier and the first resonant antenna and configured to vary impedance to an optimal impedance so as to provide impedance matching between the power amplifier and the first resonant antenna;

a directional power coupler disposed between the power amplifier and the impedance matching unit or between the impedance matching unit and the first resonant antenna, and configured to have directionality such that the wireless power signal, which is inputted from the power amplifier or the impedance matching unit through a first port, is outputted to the first resonant antenna through a second port, and such that the reflected wireless power signal, which is inputted from the first resonant antenna through the second port, is output through a third port;

an output power detector configured to detect output power from the wireless power signal which is outputted from the second port of the directional power coupler, and output detected output power;

a reflected power detector configured to detect reflected power from the reflected wireless power signal which is outputted from the third port of the directional power coupler, and output the detected reflected power;

a variable voltage regulator configured to vary an input voltage and transfer a boosted output voltage to the power amplifier such that a wireless power signal to be amplified by the power amplifier has a maximum level of output power depending on an output power-to-reflected power ratio; and a transmission controller configured to:

detect whether the load device is present depending on the output power-to-reflected power ratio calculated using the output power and the reflected power which have been inputted, control the impedance matching unit so that when the load device is present, impedance attributable to the variation in the distance to the load device varies depending on the output power-to-reflected power ratio, thereby realizing matching to an optimal impedance, and control the variable voltage regulator so that when the load device is present, the output power attributable to the variation in the distance to the load device varies depending on the output power-to-reflected power ratio, thereby allowing maximum output power to be tracked, and perform control such that the wireless power signal which has been matched to the optimal impedance and has been amplified to the maximum output power is transmitted through the first resonant antenna, wherein the variable voltage regulator comprises:

a Direct Current (DC)-DC converter configured to vary and boost an input voltage, and output an output voltage which is divided into a reference voltage and a variable voltage such that the output voltage is adjustable depending on the output power-to-reflected power ratio;

a first load resistor configured to form the reference voltage;

a resistance adjustment module connected between the first load resistor and a ground, and configured to include a plurality of parallel-connected second load resistors having different values and a plurality of switches connected to the respective second load resistors, and form the variable voltage using a relevant second load resistor selected from among the plurality of second load resistors depending on the output power-to-reflected power ratio; and a second switch controller configured to control ON/OFF operations of the second switches under control of the transmission controller such that a relevant second load resistor is selected from among the plurality of second load resistors depending on the output power-to-reflected power ratio, wherein a maximum output voltage which varies with a ratio of resistances of the first load resistor to the selected second load resistor depending on the output power-to-reflected power ratio is provided to the power amplifier.

2. The wireless power transmission/reception apparatus as set forth in claim 1, wherein the impedance matching unit comprises:

a transformer module including a primary coil and a secondary coil;

a plurality of first switches disposed on the primary coil such that a turn ratio of the transformer module is variable; and a first switch controller connected to the plurality of first switches, and configured to control ON/OFF operations of the first switches under control of the transmission controller such that a turn ratio of the primary coil to the secondary coil varies so as to control impedance depending on the output power-to-reflected power ratio.

3. The wireless power transmission/reception apparatus as set forth in claim 1, wherein the transmission controller comprises:

a comparison module configured to compare the output power-to-reflected power ratio, calculated using the output power and the reflected power which have been inputted, with a preset value, thus determining whether a load device is present;

an impedance tracking module configured to control the impedance matching unit such that when it is determined that the load device is present, impedance attributable to the variation in the distance to the load device varies depending on the output power-to-reflected power ratio, thereby tracking optimal impedance; and a power tracking module configured to control the variable voltage regulator such that when it is determined that the load device is present, output power attributable to the variation in the distance to the load device varies depending on the output power-to-reflected power ratio, thereby tracking maximum output power.

4. The wireless power transmission/reception apparatus as set forth in claim 1, wherein the wireless power transmission unit further comprises a power pass switch configured to provide a bypass path such that depending on whether the load device is present, the frequency oscillator is connected to the power amplifier, and the frequency oscillator is connected to the impedance matching unit or the directional power coupler.

5. A wireless power transmission/reception apparatus, comprising:
a wireless power transmission unit configured to:
receive externally input power,
generate a wireless power signal to be transmitted in a wireless manner,
transmit the generated wireless power signal using magnetic resonance,
receive a reflected wireless power signal,
determine whether a load device is present, and
transmit a further wireless power signal when it is determined that the load device is present in such a way that variations in impedance and output power depending on a variation in a distance to the load device are tracked, and the further wireless power signal, which has been matched to an optimal impedance and which has been amplified to a maximum level of output power, is transmitted in a wireless manner to allow power to be supplied to the load device; and
a wireless power reception unit connected to the load device, and configured to receive the wireless power signal from the wireless power transmission unit using magnetic resonance, to provide the wireless power signal to the load device connected to the wireless power reception unit, and to reflect the reflected wireless power signal, which was not consumed, towards the wireless power transmission unit,
wherein the wireless power transmission unit comprises:
a frequency oscillator configured to receive the externally input power and generating a wireless power signal desired to be transmitted;
a power amplifier configured to amplify the wireless power signal generated by the frequency oscillator and output an amplified wireless power signal;
a first resonant antenna configured to transmit the wireless power signal using magnetic resonance, and receive the reflected wireless power signal that is reflected from the wireless power reception unit using magnetic resonance;
an impedance matching unit disposed between the power amplifier and the first resonant antenna and configured to vary impedance to an optimal impedance so as to provide impedance matching between the power amplifier and the first resonant antenna;
a directional power coupler disposed between the power amplifier and the impedance matching unit or between the impedance matching unit and the first resonant antenna, and configured to have directionality such that the wireless power signal, which is inputted from the power amplifier or the impedance matching unit through a first port, is outputted to the first resonant antenna through a second port, and such that the reflected wireless power signal, which is inputted from the first resonant antenna through the second port, is output through a third port;
an output power detector configured to detect output power from the wireless power signal which is outputted from the second port of the directional power coupler, and output detected output power;
a reflected power detector configured to detect reflected power from the reflected wireless power signal which is outputted from the third port of the directional power coupler, and output the detected reflected power;
a variable voltage regulator configured to vary an input voltage and transfer a boosted output voltage to the power amplifier such that a wireless power signal to be amplified by the power amplifier has a maximum level of output power depending on an output power-to-reflected power ratio; and
a transmission controller configured to:
detect whether the load device is present depending on the output power-to-reflected power ratio calculated using the output power and the reflected power which have been inputted, control the impedance matching unit so that when the load device is present, impedance attributable to the variation in the distance to the load device varies depending on the output power-to-reflected power ratio, thereby realizing matching to an optimal impedance, and
control the variable voltage regulator so that when the load device is present, the output power attributable to the variation in the distance to the load device varies depending on the output power-to-reflected power ratio, thereby allowing maximum output power to be tracked, and
perform control such that the wireless power signal which has been matched to the optimal impedance and has been amplified to the maximum output power is transmitted through the first resonant antenna,
wherein the transmission controller comprises:
a comparison module configured to compare the output power-to-reflected power ratio, calculated using the output power and the reflected power which have been inputted, with a preset value, thus determining whether a load device is present;
an impedance tracking module configured to control the impedance matching unit such that when it is determined that the load device is present, impedance attributable to the variation in the distance to the load device varies depending on the output power-to-reflected power ratio, thereby tracking optimal impedance; and
a power tracking module configured to control the variable voltage regulator such that when it is determined that the load device is present, output power attributable to the variation in the distance to the load device varies depending on the output power-to-reflected power ratio, thereby tracking maximum output power,
wherein the impedance tracking module comprises:
a first voltage division circuit provided with a plurality of series-connected resistors which have different values and are disposed between a reflected voltage detected from the reflected power and a ground, and configured to divide the reflected voltage into a plurality of reflected voltages using the plurality of resistors;
a first comparison circuit provided with a plurality of comparators, each individually receiving a corresponding one of the plurality of reflected voltages outputted from the first voltage division circuit and an output voltage detected from the output power, and determining whether the reflected voltage is at level lower than or higher than the output voltage via comparison of voltages, the plurality of reflected voltages being converted into levels by the comparators; and a first output terminal selection circuit configured to allow any one high-level reflected voltage of the plurality of reflected voltages, converted into the levels by the first comparison circuit, to be outputted through one selected from among the plurality of output terminals, wherein the impedance tracking module tracks an optimal impedance in response to a first control signal which includes information about the output terminal selected by the first output terminal selection circuit, thus controlling the impedance matching unit.

6. The wireless power transmission/reception apparatus as set forth in claim 5, wherein the power tracking module comprises:

a second voltage division circuit provided with a plurality of series-connected resistors which have different values and are disposed between a reflected voltage detected from the reflected power and a ground, and configured to divide the reflected voltage into a plurality of reflected voltages using the plurality of resistors;

a second comparison circuit provided with a plurality of comparators, each individually receiving a corresponding one of the plurality of reflected voltages outputted from the second voltage division circuit and an output voltage detected from the output power, and determining whether the reflected voltage is at level lower than or higher than the output voltage via comparison of voltages, the plurality of reflected voltages being converted into levels by the comparators; and a second output terminal selection circuit configured to allow any one high-level reflected voltage of the plurality of reflected voltages, converted into the levels by the second comparison circuit, to be outputted through one selected from among the plurality of output terminals, wherein the power tracking module tracks a maximum voltage in response to a second control signal which includes information about the output terminal selected by the second output terminal selection circuit, thus controlling the variable voltage regulator.

* * * * *